(12) United States Patent
Yoda

(10) Patent No.: US 11,472,196 B2
(45) Date of Patent: Oct. 18, 2022

(54) THERMAL TRANSFER SHEET, COMBINATION OF INTERMEDIATE TRANSFER MEDIUM AND THERMAL TRANSFER SHEET, METHOD FOR PRODUCING PRINTED MATERIAL, AND DECORATIVE MATERIAL

(71) Applicant: Dai Nippon Printing Co., Ltd., Tokyo (JP)

(72) Inventor: Shinya Yoda, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 180 days.

(21) Appl. No.: 16/976,622

(22) PCT Filed: Jan. 25, 2019

(86) PCT No.: PCT/JP2019/002478
§ 371 (c)(1),
(2) Date: Aug. 28, 2020

(87) PCT Pub. No.: WO2019/176323
PCT Pub. Date: Sep. 19, 2019

(65) Prior Publication Data
US 2021/0001639 A1    Jan. 7, 2021

(30) Foreign Application Priority Data

Mar. 16, 2018  (JP) .............................. JP2018-049439

(51) Int. Cl.
*B41M 5/382*    (2006.01)
*B41J 2/325*    (2006.01)
(Continued)

(52) U.S. Cl.
CPC ............. *B41J 2/3355* (2013.01); *B32B 27/32* (2013.01); *B32B 27/36* (2013.01); *B41J 2/325* (2013.01);
(Continued)

(58) Field of Classification Search
CPC ...... B41J 2/3355; B41J 2/325; B41J 2/33505; B32B 27/32; B32B 27/36; B41M 5/382;
(Continued)

(56) References Cited

U.S. PATENT DOCUMENTS 5,236,767 A    8/1993   Torigoe et al.
6,040,268 A *  3/2000   Ueno ................... B41M 7/0027
                                                           503/227
(Continued)

FOREIGN PATENT DOCUMENTS

JP    H06-240223 A1    8/1994
JP    H07-266727 A1    10/1995
(Continued)

OTHER PUBLICATIONS

Extended European Search Report (Application No. 19767390.8) dated Apr. 8, 2021.
(Continued)

*Primary Examiner* — Yaovi M Ameh
(74) *Attorney, Agent, or Firm* — Burr & Brown, PLLC

(57) ABSTRACT

A thermal transfer sheet, a combination of an intermediate transfer medium and a thermal transfer sheet, method for producing a printed material using the thermal transfer sheet, and a decorative material, wherein the thermal transfer sheet includes a transfer layer on one surface of a substrate, the transfer layer having a single layer structure consisting only of a heat seal layer or a multilayer structure including a heat seal layer, and in a case where the transfer layer has the multilayer structure, the heat seal layer among the layers
(Continued)

constituting the transfer layer is positioned closest to the substrate. The heat seal layer contains one or both of (i) a polyester having a glass transition temperature (Tg) of 55° C. or more and a number average molecular weight (Mn) of 15000 or less, and (ii) a polyester having a glass transition temperature (Tg) of less than 55° C.

9 Claims, 4 Drawing Sheets

(51) Int. Cl.
*B41J 2/335* (2006.01)
*B32B 27/32* (2006.01)
*B32B 27/36* (2006.01)
*B41M 5/44* (2006.01)
*B41M 5/395* (2006.01)

(52) U.S. Cl.
CPC .......... *B41J 2/33505* (2013.01); *B41M 5/382* (2013.01); *B41M 5/38257* (2013.01); *B41M 5/38264* (2013.01); *B41M 5/44* (2013.01); *B41M 5/38207* (2013.01); *B41M 5/395* (2013.01); *B41M 2205/06* (2013.01); *B41M 2205/30* (2013.01); *B41M 2205/38* (2013.01); *B41M 2205/40* (2013.01)

(58) Field of Classification Search
CPC .............. B41M 5/38207; B41M 5/395; B41M 2205/06; B41M 2205/30; B41M 2205/38; B41M 2205/40; B41M 5/38257; B41M 5/38264; B41M 5/44
See application file for complete search history.

(56) References Cited

U.S. PATENT DOCUMENTS

| | | |
|---|---|---|
| 2002/0000286 A1 | 1/2002 | Onishi et al. |
| 2006/0275671 A1 | 12/2006 | Eto et al. |
| 2017/0190203 A1* | 7/2017 | Imakura ............. B41M 5/38214 |

FOREIGN PATENT DOCUMENTS

| | | | |
|---|---|---|---|
| JP | H08-276999 A1 | 10/1996 | |
| JP | H11-263075 A1 | 9/1999 | |
| JP | 2001-010235 A1 | 1/2001 | |
| JP | 2001-121831 A1 | 5/2001 | |
| JP | 2004-351656 A1 | 12/2004 | |
| JP | 2005-342974 A1 | 12/2005 | |
| JP | 2006-056134 A1 | 3/2006 | |
| JP | 2007-011318 A1 | 1/2007 | |
| JP | 2007-323100 A1 | 12/2007 | |
| JP | 2008-158219 A1 | 7/2008 | |
| JP | 2010-018025 A1 | 1/2010 | |
| JP | 4467853 B2 * | 5/2010 | ............ B41M 5/395 |
| JP | 2011-020351 A1 | 2/2011 | |

OTHER PUBLICATIONS

International Search Report and Written Opinion (Application No. PCT/JP2019/002478) dated Apr. 2, 2019.

* cited by examiner

THERMAL TRANSFER SHEET, COMBINATION OF INTERMEDIATE TRANSFER MEDIUM AND THERMAL TRANSFER SHEET, METHOD FOR PRODUCING PRINTED MATERIAL, AND DECORATIVE MATERIAL

FIELD OF THE INVENTION

The present invention relates to a thermal transfer sheet, a combination of an intermediate transfer medium and a thermal transfer sheet, a method for producing a printed material, and a decorative material.

BACKGROUND OF THE INVENTION

As one of the methods for producing a printed material, a thermal transfer method has been widely used, in which a thermal transfer sheet provided with a coloring material layer formed on one surface of a substrate is combined with a thermal transfer image-receiving sheet provided with a receiving layer formed on one surface of another substrate, and a thermal transfer image is formed on the receiving layer of the thermal transfer image-receiving sheet. As the thermal transfer method, a sublimation-type thermal transfer method and a melt-type thermal transfer method have been known. In the sublimation-type thermal transfer method, a coloring material contained in a coloring material layer of a thermal transfer sheet is selectively moved to a receiving layer of a thermal transfer image-receiving sheet by a heating means such as a thermal head. In the melt-type thermal transfer method, a coloring material layer melted or softened by a heating means such as a thermal head is transferred itself onto a receiving layer of a thermal transfer image-receiving sheet. According to these thermal transfer methods, a printed material with a thermal transfer image formed on a receiving layer of a thermal transfer image-receiving sheet can be obtained.

Along with the diversification of printed materials, there are also many demands for obtaining a printed material in which a thermal transfer image is formed on an arbitrary transfer-receiving body (for example, a card substrate or the like) rather than a printed material in which a thermal transfer image is formed on a receiving layer of a thermal transfer image-receiving sheet. In response to these demands, a method for producing a printed material by using an intermediate transfer medium has been proposed, in which a transfer layer containing a receiving layer is provided on one surface of a substrate and the receiving layer is positioned on the outermost surface. In the method for producing a printed material by using an intermediate transfer medium, a thermal transfer image is formed on a receiving layer of the intermediate transfer medium positioned on the outermost surface, and then an arbitrary object is combined with the intermediate transfer medium, a transfer layer containing the receiving layer on which the thermal transfer image has been formed is transferred onto the arbitrary object, and as a result, a printed material, which has the transfer layer containing the receiving layer on which the thermal transfer image has been formed on the arbitrary object, is obtained.

By the way, as described above, since the receiving layer is positioned on the outermost surface of the intermediate transfer medium, when the transfer layer containing the receiving layer is transferred onto the arbitrary transfer-receiving body, the receiving layer functions as the layer that directly comes into contact with the transfer-receiving body. Therefore, in order to transfer the transfer layer containing the receiving layer on the arbitrary transfer-receiving body with good adhesiveness (high transferability), it is required to apply a measure for improving the adhesiveness to the arbitrary transfer-receiving body in the receiving layer. In other words, it is required to impart a function as the adhesive layer to the receiving layer.

Under these circumstances, various proposals have been made to impart the adhesiveness to a transfer-receiving body to a receiving layer, and for example, in Patent Literature 1, in order to improve the adhesiveness to a transfer-receiving body, an intermediate transfer sheet (equivalent to an intermediate transfer medium) in which a peeling layer, a curable protective layer, an intermediate adhesive layer, and an image-receiving and adhesive layer are provided on a support has been proposed. In summary, there has been proposed an intermediate transfer medium that is provided with a receiving layer having a function as the adhesive layer together with a dyeing property to a coloring material. By the way, as proposed in Patent Literature 1, in order to impart to a receiving layer both functions of the dyeing property to a coloring material and the adhesiveness to a transfer-receiving body, (1) in the receiving layer, it is required to replace a part of the components having the dyeing property to a coloring material with a component having the adhesiveness to a transfer-receiving body, or (2) it is required to include in a receiving layer a component having both functions of the dyeing property to a coloring material and the adhesiveness to a transfer-receiving body. However, in a case of the former (1), by including a component having the adhesiveness to a transfer-receiving body, the content of the component having the dyeing property to a coloring material in the receiving layer is reduced correspondingly, and it becomes difficult to form a high-density thermal transfer image on the receiving layer. In other words, the degree of freedom in the design for improving the dyeing property to a coloring material of the receiving layer is decreased. Also, in a case of the latter (2), the dyeing property and the adhesiveness to a transfer-receiving body, which withstand the use in the field where higher density and higher adhesiveness to a transfer-receiving body are required, have not yet been imparted to the receiving layer in the present situation.

CITATION LIST

Patent Literature

Patent Literature 1: JP 2004-351656 A

SUMMARY OF THE INVENTION

Technical Problem

The present invention has been made in view of the situation described above, and a main object of the present invention is to provide a thermal transfer sheet, a combination of an intermediate transfer medium and the thermal transfer sheet, and a method for producing a printed material by using the the/mal transfer sheet, the thermal transfer sheet, the combination, and the method being able to produce a printed material having high interlayer adhesiveness, and to provide a decorative material having high adhesiveness between a transfer-receiving body and a decorative body.

Solution to the Problem

In a thermal transfer sheet according to an embodiment of the present disclosure for solving the problem described above, a transfer layer is provided on at least a part of one surface of a substrate, and the transfer layer exhibits a single layer structure consisting only of a heat seal layer or a multilayer structure formed by stacking two or more layers including the heat seal layer, and in a case where the transfer layer exhibits the multilayer structure, the heat seal layer among the layers constituting the transfer layer is positioned closest to the substrate, and the heat seal layer contains one or both of (i) a polyester having a glass transition temperature (Tg) of 55° C. or more and a number average molecular weight (Mn) of 15000 or less, and (ii) a polyester having a glass transition temperature (Tg) of less than 55° C.

Further, in the above-described thermal transfer sheet, the transfer layer and a coloring material layer may be disposed in any order on one surface of the substrate.

Moreover, in the thermal transfer sheet, the transfer layer may contain an anti-blocking layer, and the anti-blocking layer among the layers constituting the transfer layer may be positioned farthest from the substrate. Further, the anti-blocking layer may contain a resin component having a glass transition temperature (Tg) of 55° C. or more and a number average molecular weight (Mn) of 20000 or less. Moreover, the anti-blocking layer may contain a coloring agent.

In the combination of an intermediate transfer medium and the thermal transfer sheet, according to an embodiment of the present disclosure for solving the problem described above, as the thermal transfer sheet, the thermal transfer sheet described above is used.

Further, the method for producing a printed material, according to an embodiment of the present disclosure for solving the problem described above, includes the following steps of: preparing the thermal transfer sheet in which a first transfer layer exhibiting a single layer structure consisting only of a heat seal layer, or a first transfer layer exhibiting a multilayer structure formed by stacking two or more layers including a heat seal layer, the heat seal layer among the layers forming the multilayer structure, being positioned closest to a first substrate, is provided on at least a part of one surface of the first substrate; preparing the intermediate transfer medium in which a second transfer layer exhibiting a single layer structure consisting only of a receiving layer, or a second transfer layer exhibiting a multilayer structure formed by stacking two or more layers including a receiving layer, the receiving layer among the layers forming the multilayer structure, being positioned farthest from a second substrate, is provided on at least a part of one surface of the second substrate; forming a thermal transfer image on the receiving layer of the intermediate transfer medium; combining the intermediate transfer medium with the thermal transfer sheet, and transferring the first transfer layer of the thermal transfer sheet onto the second transfer layer of the intermediate transfer medium; and combining the intermediate transfer medium onto which the first transfer layer is transferred with a transfer-receiving body, and transferring the second transfer layer together with the first transfer layer onto the transfer-receiving body, in which the heat seal layer of the thermal transfer sheet contains one or both of (i) a polyester having a glass transition temperature (Tg) of 55° C. or more and a number average molecular weight (Mn) of 15000 or less, and (ii) a polyester having a glass transition temperature (Tg) of less than 55° C.

Moreover, in the method for producing a printed material described above, the thermal transfer sheet may be a thermal transfer sheet in which the coloring material layer and the first transfer layer are disposed in any order on one surface of the first substrate, and the thermal transfer image may be formed on the receiving layer of the intermediate transfer medium by using the coloring material layer of the thermal transfer sheet in the step of forming the thermal transfer image.

Further, the decorative material according to an embodiment of the present disclosure for solving the problem described above includes a decorative body for decorating the transfer-receiving body provided on the transfer-receiving body, in which a heat seal layer is provided at a position in contact with the transfer-receiving body and between the transfer-receiving body and the decorative body, and the heat seal layer contains one or both of (i) a polyester having a glass transition temperature (Tg) of 55° C. or more and a number average molecular weight (Mn) of 15000 or less, and (ii) a polyester having a glass transition temperature (Tg) of less than 55° C.

Advantageous Effects of the Invention

According to the thermal transfer sheet or method for producing a printed material of embodiments of the present disclosure, a printed material having high interlayer adhesiveness can be produced. Moreover, according to the decorative material of the present disclosure, adhesiveness between a transfer-receiving body and a decorative body can be enhanced.

DETAILED DESCRIPTION OF THE INVENTION

Figure 1:
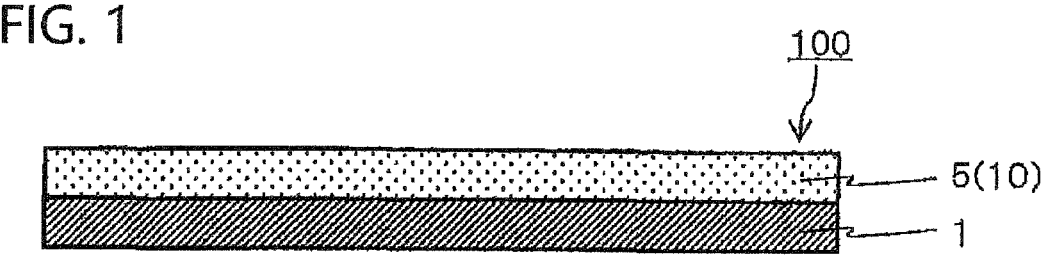
FIG. 1 is a schematic sectional view showing an example of a thermal transfer sheet of the present disclosure.

Hereinafter, the embodiments of the present invention will be described by making reference to drawings or the like. Incidentally, the present invention can be implemented in many different embodiments, and is not construed as being limited to the contents of the description of embodiments illustrated below. Further, in order to clarify the description of the drawings, there may be a case where the width, thickness, shape, and the like of each part are expressed schematically as compared with the actual embodiment; however, the case is merely an example, and does not limit the interpretation of the present invention. In addition, in the specification and each of the drawings, elements similar to those described previously with respect to the drawings described already may be given the same reference numerals, and detailed descriptions thereof may be omitted as appropriate. Further, for convenience of description, description will be made by using terms "upward", "downward", or the like; however, the upward and downward directions may be reversed. The same applies to the right and left directions.

<<Method for Producing Printed Material>>

Hereinafter, the method for producing a printed material of the present disclosure (hereinafter, referred to as the method for producing a printed material of the present disclosure) will be described with reference to FIGS. 5 and 6 as examples.

The method for producing a printed material of the present disclosure includes a step of preparing a thermal transfer sheet 100 in which a first transfer layer (10) is provided on at least a part of one surface of a first substrate (1), and a step of preparing an intermediate transfer medium 200 in which a second transfer layer (210) is provided on at least a part of one surface of a second substrate (201).

The first transfer layer (10) of the thermal transfer sheet 100 has a single layer structure or a multilayer structure, and includes a heat seal layer 5. In a case where the first transfer layer (10) has the multilayer structure, the heat seal layer 5 among the layers constituting the first transfer layer (10) is positioned closest to the first substrate (1) side.

The second transfer layer (210) of the intermediate transfer medium 200 has a single layer structure or a multilayer structure, and includes a receiving layer 205. In a case where the second transfer layer (210) has the multilayer structure, the receiving layer 205 among the layers constituting the second transfer layer (210) is positioned farthest from the second substrate (201) side. That is, the receiving layer 205 is positioned on the outermost surface of the intermediate transfer medium 200.

Figure 5A:
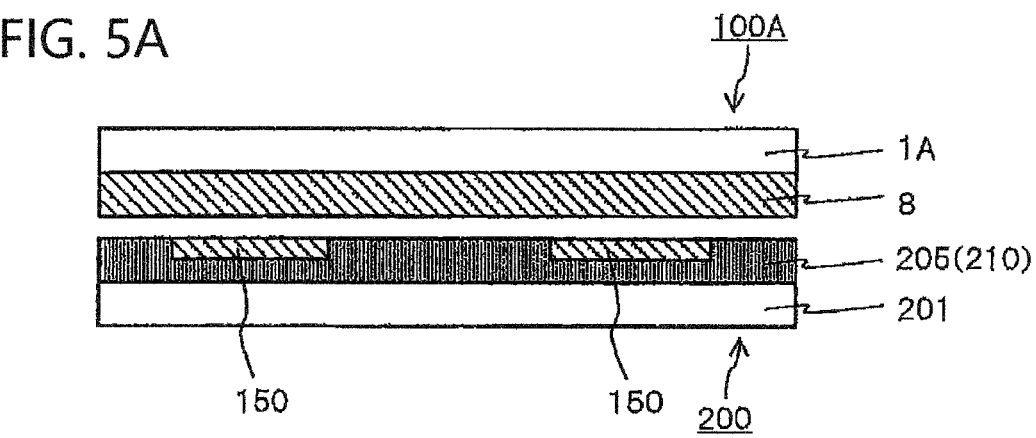
FIG. 5 is a process diagram showing an example of a method for producing a printed material of the present disclosure.
Figure 5B:
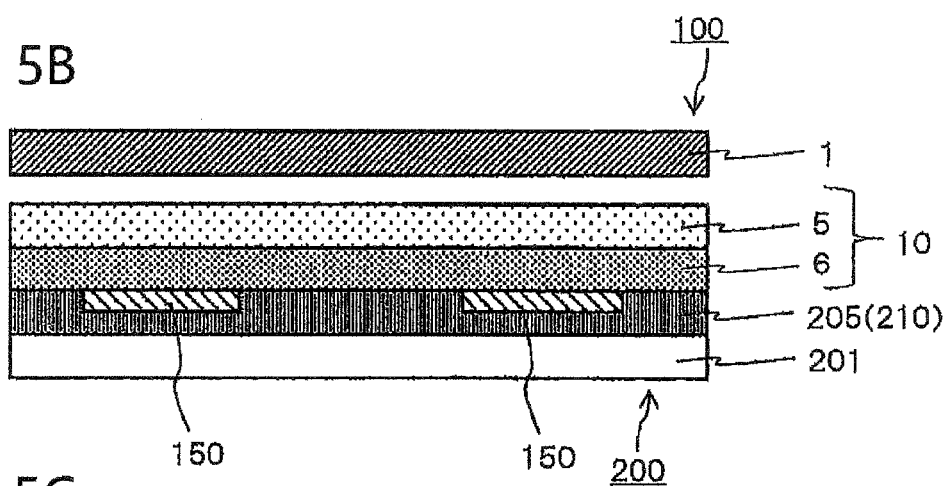
Figure 5C:
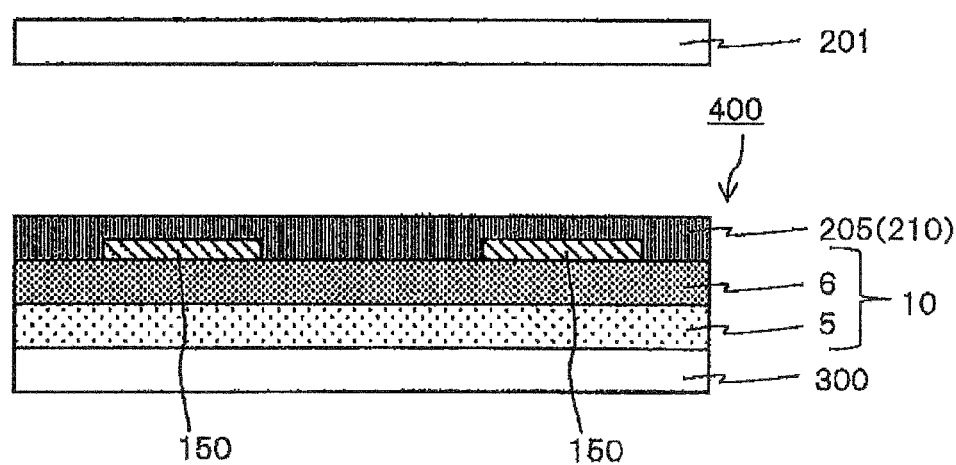
Figure 6A:
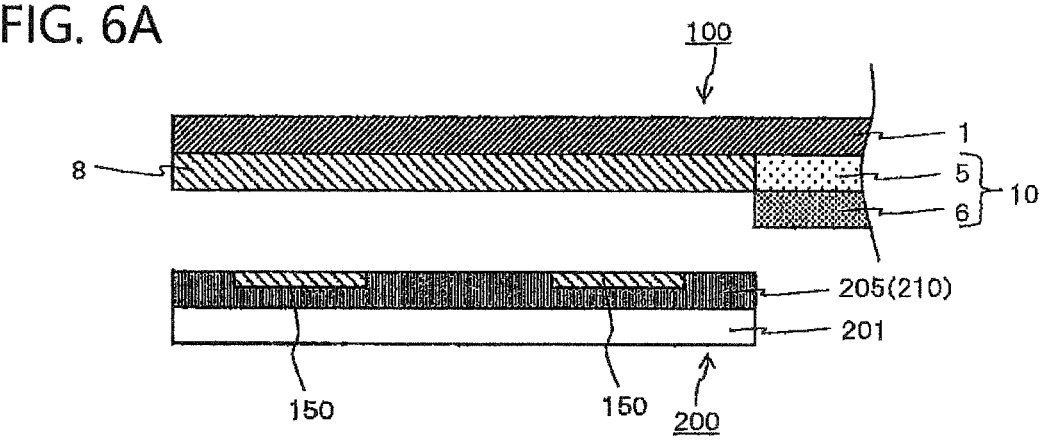
FIG. 6 is a process diagram showing an example of a method for producing a printed material of the present disclosure.
Figure 6B:
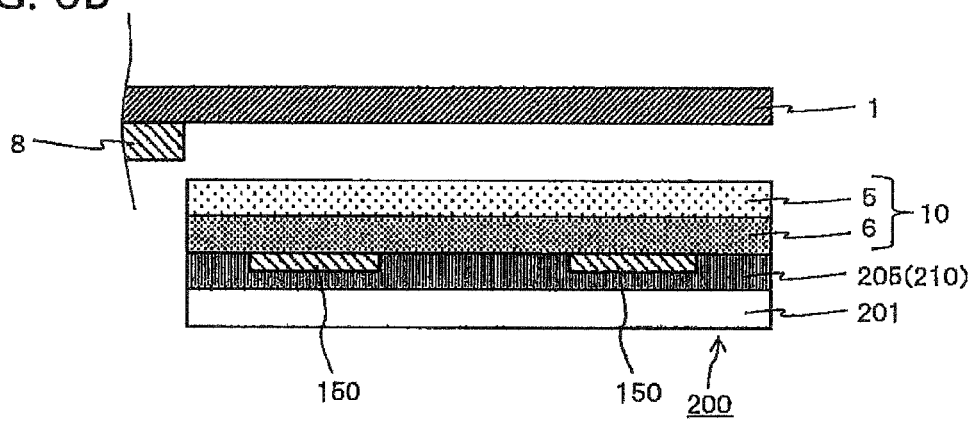
Figure 6C:
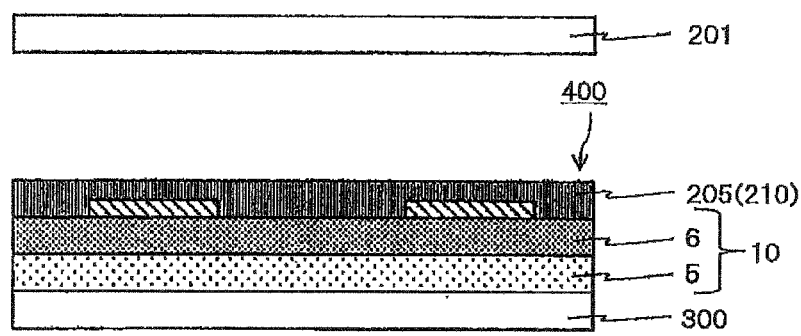

Moreover, the method for producing a printed material of the present disclosure includes: a thermal transfer image formation step of forming a thermal transfer image 150 on the receiving layer 205 of the intermediate transfer medium 200 (see FIGS. 5A and 6A); a first transfer step of combining the intermediate transfer medium 200 with the thermal transfer sheet 100, and transferring the first transfer layer (10) of the thermal transfer sheet 100 on the second transfer layer (210) of the intermediate transfer medium 200 (see FIGS. 5B and 6B); and a second transfer step of combining the intermediate transfer medium 200 in which the first transfer layer (10) has been transferred onto the second transfer layer (210) with a transfer-receiving body 300, and transferring the second transfer layer (210) together with the first transfer layer (10) onto the transfer-receiving body 300 (see FIGS. 5C and 6C). FIGS. 5 and 6 are process diagrams for describing a method for producing a printed material of the present disclosure, and both of them are schematic sectional views. Incidentally, in the method for producing a printed material of the present disclosure shown in FIG. 5, a thermal transfer sheet 100A in which a coloring material layer 8 is provided on one surface of a substrate 1A, and the thermal transfer sheet 100 in which a transfer layer 10 is provided on one surface of a substrate 1 are used. On the other hand, in the method for producing a printed material of the present disclosure shown in FIG. 6, the thermal transfer sheet 100 is used, in which the transfer layer 10 and the coloring material layer 8 are disposed in any order on one surface of the substrate 1.

Further, in the method for producing a printed material of the present disclosure, as the thermal transfer sheet 100, a thermal transfer sheet is used, in which the heat seal layer 5 contains one or both of (i) a polyester having a glass transition temperature (Tg) of 55° C. or more and a number average molecular weight (Mn) of 15000 or less, and (ii) a polyester having a glass transition temperature (Tg) of less than 55° C.

In the method for producing a printed material of the present disclosure, by setting the heat seal layer 5 of the thermal transfer sheet 100 to have the constitution described above, good adhesiveness can be imparted to the heat seal layer 5. Therefore, in the method for producing a printed material of the present disclosure, a printed material having high interlayer adhesiveness can be produced.

Specifically, in the method for producing a printed material of the present disclosure, the second transfer layer (210) of the intermediate transfer medium 200 and the transfer-receiving body 300 are not brought into close contact directly with each other, but the second transfer layer (210) of the intermediate transfer medium 200 and the transfer-receiving body 300 are brought into close contact with each other with the first transfer layer (10) containing the above-described heat seal layer 5 therebetween, and therefore, due to the above-described effect of the heat seal layer 5, the adhesiveness between the second transfer layer (210) of the intermediate transfer medium 200 and the transfer-receiving body 300 can be made good.

In particular, in the method for producing a printed material of the present disclosure, when the second transfer layer (210) of the intermediate transfer medium 200 is transferred onto the transfer-receiving body 300, even in a case where the energy to be applied onto the intermediate transfer medium 200 side is set to be lower than the energy that has been conventionally applied, the adhesiveness between the second transfer layer (210) of the intermediate transfer medium 200 and the transfer-receiving body 300 can be made good. As a result, damage to each of the structural members constituting a printed material that is produced by the method for producing a printed material of the present disclosure can be suppressed. For example, according to the method for producing a printed material of the present disclosure, even in a case where the transfer-receiving body 300 that is easily damaged by energy is used as the transfer-receiving body, occurrence of the deformation and the like of the transfer-receiving body 300 can be suppressed. Further, according to the method for producing a printed material of the present disclosure, with which the adhesiveness between the second transfer layer (210) of the intermediate transfer medium 200 and the transfer-receiving body 300 can be made good with an energy lower than the energy that has been conventionally applied, occurrence of curl in a printed material to be produced can be suppressed.

Moreover, by imparting a function of adhesiveness to the heat seal layer 5 constituting the first transfer layer (10), the degree of freedom in the design of the receiving layer 205 can be increased without needing to impart a function of adhesiveness to the receiving layer 205 of the intermediate transfer medium 200. Specifically, the receiving layer 205 of the intermediate transfer medium 200 can be specialized in the dyeing property to a coloring material.

Figure 7A:
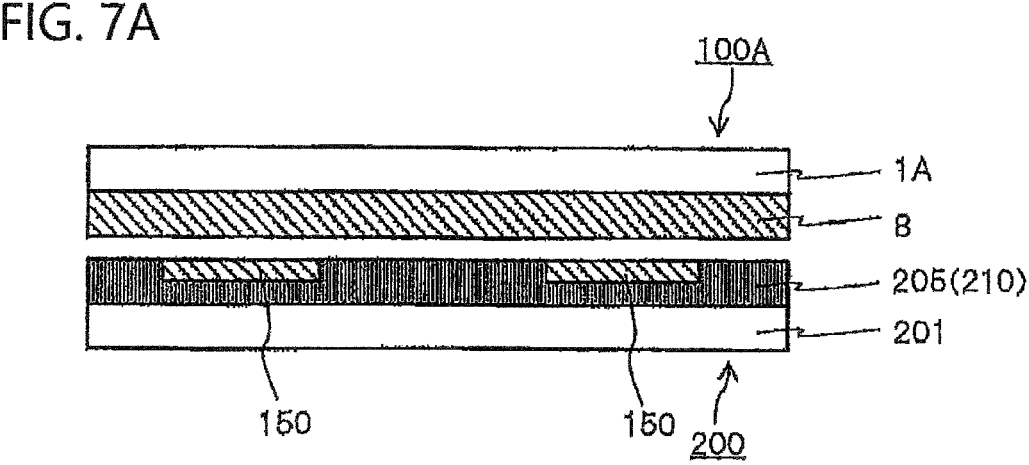
FIG. 7 is a process diagram showing an example of a method for producing a printed material for comparison.

Hereinafter, with reference to FIG. 7, the superiority of the method for producing a printed material of the present disclosure will be described with reference as an example to a method for producing a printed material using the intermediate transfer medium 200 and the transfer-receiving body 300 without using the thermal transfer sheet 100 provided with the first transfer layer (10) (hereinafter, sometimes may be referred to as a comparative method for producing a printed material). In this regard, the intermediate transfer medium 200 to be used in the comparative method for producing a printed material has a constitution in which the second transfer layer (210) having a single layer structure or multilayer structure containing the receiving layer 205 is provided on the second substrate (201) so that the receiving layer 205 is positioned on the outermost surface of the intermediate transfer medium 200 (the second transfer layer (210) shown in FIG. 7 has a single layer structure consisting only of the receiving layer 205).

Figure 7B:
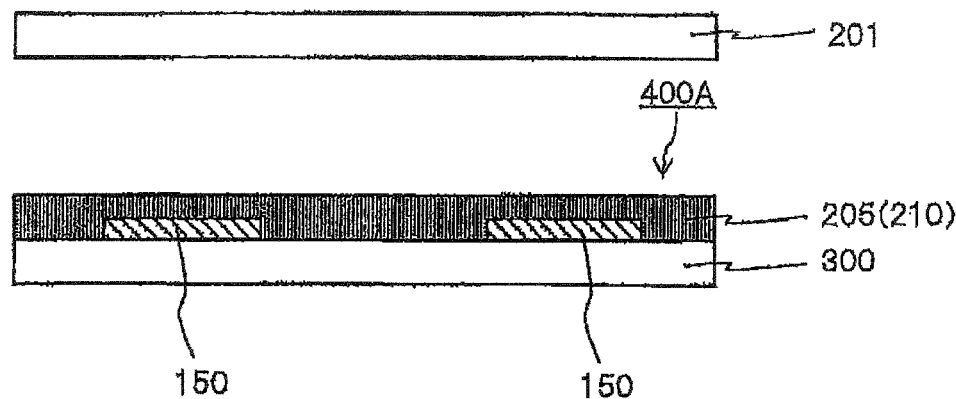

In the comparative method for producing a printed material, the thermal transfer image 150 is formed on the receiving layer 205 of the intermediate transfer medium 200 (see FIG. 7A) by using the thermal transfer sheet 100 A that has the coloring material layer 8 on one surface of the substrate 1A, and then the second transfer layer (210) containing the receiving layer 205 on which the thermal transfer image 150 has been formed is transferred onto the transfer-receiving body 300 to produce a printed material 400A (see FIG. 7B).

In the comparative method for producing a printed material, when the second transfer layer (210) of the intermediate transfer medium 200 is transferred onto the transfer-receiving body 300, the transfer-receiving body 300 and the receiving layer 205 that is positioned on the outermost surface of the intermediate transfer medium 200 directly come into contact with each other. Therefore, in order to make the adhesiveness of the second transfer layer (210) of the intermediate transfer medium 200 to the transfer-receiving body 300 good, it is required that the receiving layer 205 of the intermediate transfer medium 200 has good adhesiveness (sometimes may be referred to as bonding capability) to the transfer-receiving body 300. By the way, in the method for producing a printed material for comparison, in order to form a high-density thermal transfer image on the receiving layer 205 of the intermediate transfer medium 200, in other words, in order to form the printed material 400A having a high-density thermal transfer image, it is required that the dyeing property of the receiving layer 205 to a coloring material is good, in other words, the receiving layer 205 contains a component having an excellent dyeing property to a coloring material.

However, in general, in a case where the receiving layer 205 is prepared to contain only a component having an excellent dyeing property to a coloring material, sufficient adhesiveness cannot be imparted to the receiving layer 205, and in a case where the receiving layer 205 is prepared to contain only a component having an excellent dyeing property to a coloring material, it becomes difficult to sufficiently satisfy the adhesiveness of the second transfer layer (210) to the transfer-receiving body 300 when the second transfer layer (210) of the intermediate transfer medium 200 is transferred onto the transfer-receiving body 300.

On the other hand, it may be considered that a receiving layer having both functions is obtained by preparing a component having an excellent dyeing property to a coloring material and a component having an excellent adhesiveness to the transfer-receiving body 300 are both contained in the receiving layer 205 of the intermediate transfer medium 200. However, in a case where the content of the component having an excellent adhesiveness to the transfer-receiving body in the receiving layer 205 is increased with the main aim of improving the adhesiveness of the second transfer layer (210) to the transfer-receiving body 300, the content of the component having an excellent dyeing property to a coloring material in the receiving layer 205 is reduced correspondingly, so that it becomes difficult to cope with the formation of a printed material that requires a higher density. On the other hand, in a case where the content of the component having an excellent dyeing property to a coloring material in the receiving layer 205 is increased with the main aim of forming a thermal transfer image having a high-density, the content of the component having an excellent adhesiveness to the transfer-receiving body 300 in the receiving layer 205 is reduced correspondingly, so that depending on the transfer-receiving body 300, the receiving layer 205 cannot be brought into close contact with the transfer-receiving body 300, or it becomes difficult to satisfy the adhesiveness of the receiving layer 205 to the transfer-receiving body 300 sufficiently.

In contrast with the above-described comparative method for producing a printed material, the method for producing a printed material of the present disclosure includes the first transfer step of transferring the first transfer layer (10) of the thermal transfer sheet 100 on the second transfer layer (210) before transferring the second transfer layer (210) of the intermediate transfer medium 200 onto the transfer-receiving body 300.

As described above, according to the method for producing a printed material of the present disclosure, the adhesiveness of the heat seal layer 5 constituting the first transfer layer (10) can be made good by (i) a polyester having a glass transition temperature (Tg) of 55° C. or more and a number average molecular weight (Mn) of 15000 or less, or (ii) a polyester having a glass transition temperature (Tg) of less than 55° C., which is contained in the heat seal layer 5. Therefore, according to the method for producing a printed material of the present disclosure, in which the second transfer layer (210) is transferred onto the transfer-receiving body 300 with the first transfer layer (10) therebetween, the adhesiveness between the second transfer layer (210) of the intermediate transfer medium 200 and the transfer-receiving body 300 can be made good as described above.

Incidentally, this does not exclude the possibility that the receiving layer 205 of the intermediate transfer medium 200 to be used in the method for producing a printed material of the present disclosure has a function of adhesiveness.

Further, in a case that a thermal transfer sheet in which only the heat seal layer in the thermal transfer sheet 100 is changed to a heat seal layer not containing the polyester of (i) or (ii) described above is used, there may be a case where the adhesiveness between the second transfer layer (210) of the intermediate transfer medium 200 and the transfer-receiving body 300 becomes high as compared with the comparative method for producing a printed material. However, the adhesiveness becomes lower than the adhesiveness in a printed material produced by the method for producing a printed material of the present disclosure. Moreover, the second transfer layer (210) of the intermediate transfer medium 200 and the transfer-receiving body 300 cannot be brought into close contact with each other with an energy lower than the energy that has been conventionally applied.

Specifically, even in a case where a heat seal layer contains a resin having a glass transition temperature (Tg) of 55° C. or more and a number average molecular weight (Mn) of 15000 or less, or a resin having a glass transition temperature (Tg) of less than 55° C., various effects by the method for producing a printed material of the present disclosure cannot be imparted in a case where the resin is not a polyester.

Hereinafter, each of the steps of the method for producing a printed material of the present disclosure will be described.

<Thermal Transfer Sheet Preparation Step>

As shown in FIGS. 1 to 4, the thermal transfer sheet preparation step is a step of preparing the thermal transfer sheet 100 in which the first transfer layer (10) is provided on at least a part of one surface of the first substrate (1), wherein the first transfer layer has a single layer structure consisting only of the heat seal layer 5, or the first transfer layer (10) has a multilayer structure formed by stacking two or more layers including the heat seal layer 5 at a position closest to the first substrate (1) among the layers forming the multilayer structure.

(First Substrate)

The first substrate (1) is an essential component in the thermal transfer sheet 100, and holds the first transfer layer (10) provided on one surface of the first substrate (1). As the material for the first substrate (1), it is not particularly limited, but it is preferred that a material withstands the heat applied when the first transfer layer (10) is transferred onto the second transfer layer (210) of the intermediate transfer medium 200 in the first transfer step, and has the mechanical properties with no difficulty in handling. Examples of the first substrate (1) include various kinds of plastic films, sheets or the like of a polyester such as polyethylene terephthalate, polycarbonate, polyimide, polyetherimide, a cellulose derivative, polyethylene, polypropylene, polystyrene, an acrylic resin, polyvinyl chloride, polyvinylidene chloride, nylon, and polyether ether ketone.

Further, in a case where an arbitrary other layer is provided between the first substrate (1) and the first transfer layer (10), for example, in a case where a release layer is provided between the first substrate (1) and the first transfer layer (10), a surface treatment may be applied onto a surface of the first substrate (1) on the first transfer layer (10) side in order to increase the adhesiveness between the first substrate (1) and the arbitrary other layer. Examples of the method for the surface treatment include corona discharge treatment, flame treatment, ozone treatment, ultraviolet treatment, radiation treatment, roughening treatment, chemical treatment, plasma treatment, low-temperature plasma treatment, primer treatment, and grafting treatment.

The thickness of the first substrate (1) is not limited, but is usually 2.5 μm or more and 100 μm or less.

(First Transfer Layer)

Figure 2:
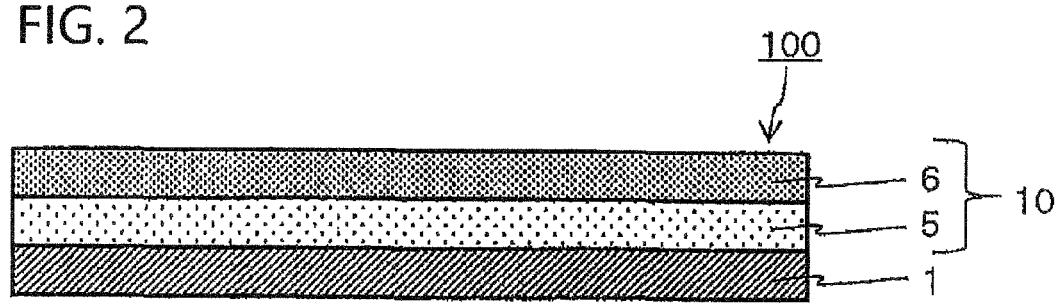
FIG. 2 is a schematic sectional view showing an example of a thermal transfer sheet of the present disclosure.

As shown in FIGS. 1 and 2, the first transfer layer (10) is provided on at least a part of one surface of the first substrate (1). The first transfer layer (10) may have a single layer structure consisting only of the heat seal layer 5 (see FIG. 1), or may have a multilayer structure containing the heat seal layer 5 (see FIG. 2). Hereinafter, in a case where the first transfer layer (10) has the multilayer structure, there may be a case where the layers other than the heat seal layer 5 are collectively referred to as function layers. Each of the function layers may also have either the single layer structure or the multilayer structure.

The first transfer layer (10) in the thermal transfer sheet 100 in the embodiment shown in FIG. 2 has a multilayer structure formed by stacking the heat seal layer 5, and an anti-blocking layer 6 as the function layer in this order from the first substrate (1) side. The first transfer layer (10) having the multilayer structure is not limited to the illustrated embodiment, and another layer can also be used as the function layer in place of or together with the anti-blocking layer 6. Incidentally, in a case where the first transfer layer (10) has the multilayer structure, a layer positioned closest to the first substrate (1) among the layers constituting the first transfer layer (10) functions as the heat seal layer 5. This is for positioning the heat seal layer 5 on the outermost surface after transfer, when the first transfer layer (10) is transferred onto the second transfer layer (210) of the intermediate transfer medium 200, in the first transfer step. Specifically, this is for bring the transfer-receiving body 300 directly into contact with the heat seal layer 5, when the second transfer layer (210) of the intermediate transfer medium 200 is transferred onto the transfer-receiving body 300, in the second transfer step.

(Heat Seal Layer)

The heat seal layer 5 constitutes the first transfer layer (10), and is a layer positioned on the outermost surface of the first transfer layer (10) when the first transfer layer (10) is transferred.

As described above, in the thermal transfer sheet 100 to be used in the method for producing a printed material of the present disclosure, the heat seal layer 5 contains one or both of (i) a polyester having a glass transition temperature (Tg) of 55° C. or more and a number average molecular weight (Mn) of 15000 or less, and (ii) a polyester having a glass transition temperature (Tg) of less than 55° C.

The glass transition temperature (Tg) of (i) the polyester of described above is preferably 55° C. or more and 100° C. or less, and more preferably 60° C. or more and 80° C. or less. Moreover, the number average molecular weight (Mn) is preferably 3000 or more and 15000 or less, and more preferably 6000 or more and 11000 or less.

The glass transition temperature (Tg) of (ii) the polyester of described above is preferably 25° C. or more and less than 55° C., and more preferably 30° C. or more and less than 55° C.

The glass transition temperature (Tg) referred to in the specification of the present application means a temperature determined by a differential scanning calorimetry (DSC) method in accordance with JIS-K-7121 (2012). Further, the number average molecular weight (Mn) referred to in the specification of the present application means an average molecular weight in terms of polystyrene measured by gel permeation chromatography (GPC) in accordance with JIS-K-7252-1 (2008).

As the polyester, a polymer containing an ester group obtained by polycondensation of a polyvalent carboxylic acid and polyhydric alcohol, or the like can be mentioned. Examples of the polyvalent carboxylic acid include terephthalic acid, isophthalic acid, phthalic acid, 2,6-naphthalene dicarboxylic acid, adipic acid, sebacic acid, decane dicarboxylic acid, azelaic acid, dodecadicarboxylic acid, cyclohexane dicarboxylic acid, and the like. Moreover, examples of the polyhydric alcohol include ethylene glycol, propanediol, butanediol, pentanediol, hexanediol, neopentyl glycol, 1,4-cyclohexanedimethanol, decanediol, 2-ethyl-butyl-1-propanediol, bisphenol A, and the like. The polyester may be a copolymer of three and more kinds of polyvalent carboxylic acids and polyhydric alcohols, and may be a copolymer with a monomer or polymer such as diethylene glycol, triethylene glycol, or polyethylene glycol. Further, the polyester includes a modified product of the polyesters described above. As the modified product of a polyester, polyester urethane or the like can be mentioned.

The content of the polyester of (i) described above and the polyester of (ii) described above with respect to the total mass of the heat seal layer 5 is not limited, and is preferably 25% by mass or more, and more preferably 50% by mass or more. The preferred upper limit value is not limited, and is 100% by mass. In a case where the heat seal layer 5 contains multiple polyesters of (i) described above and polyesters of (ii) described above, the total mass is used as a reference.

The heat seal layer 5 may contain other resin components together with the polyester of (i) described above and the polyester of (ii) described above. Examples of other resin components include an ultraviolet absorbing resin, an acrylic resin, a vinyl chloride-vinyl acetate copolymer, an epoxy resin, polycarbonate, an acetal resin, a polyamide resin, polyvinyl chloride, and the like.

The forming method for the heat seal layer 5 is not particularly limited. A coating liquid for heat seal layer is prepared by dissolving or dispersing one or both of the polyester of (i) described above and the polyester of (ii) described above, an additive material to be added as needed, and the like in an appropriate solvent.

Subsequently, the heat seal layer 5 can be formed by applying the coating liquid onto the first substrate (1), or on an arbitrary layer that is provided on the first substrate (1) and does not constitute the first transfer layer (10), for example, on a release layer, and drying the coating liquid so that the heat seal layer is positioned on the outermost surface after transfer when the first transfer layer (10) is transferred. The applying method of the coating liquid for heat seal layer is not particularly limited, and a conventionally known applying method can be appropriately selected and used. As the applying method, for example, a gravure printing method, a screen printing method, a reverse coating method using a gravure plate, or the like can be mentioned. In addition, an applying method other than the methods described above can be used. This also applies to the applying methods of various kinds of coating liquids to be described later.

The thickness of the heat seal layer 5 is not limited, and is preferably 0.2 µm or more and 10 µm or less, and more preferably 0.5 µm or more and 2.5 µm or less. By setting the thickness of the heat seal layer 5 to be the preferred thickness described above, the stability of film formation when the heat seal layer 5 is formed can be made good.

(Anti-Blocking Layer)

The first transfer layer (10) may contain the anti-blocking layer 6. The anti-blocking layer 6 is an optional layer for constituting the thermal transfer sheet 100 to be used in the method for producing a printed material of the present disclosure. Incidentally, the anti-blocking layer 6 is provided on the heat seal layer 5, and is a layer positioned farthest from the first substrate (1) among the layers constituting the first transfer layer (10). By setting the thermal transfer sheet 100 to be the thermal transfer sheet 100 provided with the first transfer layer (10) containing the anti-blocking layer 6, occurrence of blocking or the like can be suppressed during the storage of the thermal transfer sheet 100. In other words, the storage stability of the thermal transfer sheet 100 can be made good.

In particular, in a case where the heat seal layer 5 contains (ii) a polyester having a glass transition temperature (Tg) of less than 55° C. of described above, it is preferred that the first transfer layer (10) contains the anti-blocking layer 6.

The anti-blocking layer 6 in a preferred embodiment contains a resin component having a glass transition temperature (Tg) of 55° C. or more and a number average molecular weight (Mn) of 20000 or less. By setting the anti-blocking layer 6 to be the anti-blocking layer 6 in a preferred embodiment, the storage stability of the thermal transfer sheet 100 can be further made good.

Examples of the resin component contained in the anti-blocking layer 6 include a polyester, an acrylic resin, a vinyl chloride-vinyl acetate copolymer, an amide resin, and the like. In particular, a polyester, an acrylic resin, or a vinyl chloride-vinyl acetate copolymer, which satisfies the conditions of a glass transition temperature (Tg) of 55° C. or more and a number average molecular weight (Mn) of 20000 or less, can make the storage stability of the thermal transfer sheet 100 good, and further is suitable in the point of having good transferability to the intermediate transfer medium 200.

The forming method for the anti-blocking layer 6 is not particularly limited, and the anti-blocking layer 6 can be formed by preparing a coating liquid for anti-blocking layer in which materials mentioned above are dissolved or dispersed in an appropriate solvent, and by applying the coating liquid onto the heat seal layer 5 or on a layer that is arbitrarily provided on the heat seal layer 5, and drying the coating liquid. The thickness of the anti-blocking layer 6 is not particularly limited, and is preferably 0.1 µm or more and 5 µm or less, and more preferably 0.3 µm or more and 1.5 µm or less.

Further, the anti-blocking layer 6 may contain various kinds of coloring agents. By setting the anti-blocking layer 6 to be the anti-blocking layer 6 containing a coloring agent, a printed material having various kinds of designs can be produced by using the thermal transfer sheet 100 of the present disclosure. Specifically, as shown in FIG. 5, the first transfer layer (10) of the thermal transfer sheet 100 is transferred onto the second transfer layer (210) of the intermediate transfer medium 200, and subsequently, the second transfer layer (210) is transferred together with the first transfer layer (10) onto the transfer-receiving body 300 to obtain a printed material 400, and then by setting the anti-blocking layer 6 to be the colored anti-blocking layer 6 in the printed material 400, various kinds of designs can be imparted to the printed material 400 to be obtained.

For example, in a case where the anti-blocking layer 6 is set to be the anti-blocking layer 6 containing a metallic pigment, a pearl pigment, or the like, a function as a glossy layer can be imparted to a blocking layer. In this embodiment, glossy appearance can be imparted to a thermal transfer image of the printed material 400 to be obtained.

Moreover, in a case where the anti-blocking layer 6 is set to be the anti-blocking layer 6 containing titanium oxide, carbon black, or the like, functions as a ground layer and a masking layer can be imparted to the anti-blocking layer 6. In the anti-blocking layer 6 having a function as a ground layer, the visibility of a thermal transfer image can be made good when the obtained printed material 400 is viewed from the thermal transfer image side. Further, in the anti-blocking layer 6 having a function as a masking layer, texture of a transfer-receiving body can be hidden. Moreover, the anti-blocking layer 6 having a function as a masking layer is suitable, for example, in a case where the thermal transfer image is not desired to be visually recognized from the transfer-receiving body side, in a printed material to be produced by using a transfer-receiving body having transparency such as glass.

Examples of the coloring agent include a dye, an organic color pigment, a fluorescent pigment, titanium oxide, zinc oxide, carbon black, iron oxide, yellow iron oxide, ultramarine blue, hologram powder, aluminum powder, a metallic pigment, a pearl pigment, and the like.

In the embodiment shown in FIG. 2, the first transfer layer (10) takes an embodiment in which the heat seal layer 5, and the anti-blocking layer 6 as the function layer are stacked in this order from the first substrate (1) side; however, the function layer may have the multilayer structure in which a colored layer, and the anti-blocking layer 6 are stacked in this order from the heat seal layer 5 side. Further, two or more colored layers may also be used. The colored layer as an example contains a coloring agent that can exert the function as a glossy layer and the function as a masking layer, which have been described above. Moreover, the first transfer layer (10) may have a constitution in which together with a colored layer, the anti-blocking layer 6 also contains a coloring agent. For example, the first transfer layer (10) may have a constitution in which the anti-blocking layer 6 contains a coloring agent capable of exerting a function as a glossy layer, and a colored layer contains a coloring agent capable of exerting a function as a masking layer. The anti-blocking layer 6 and the colored layer may contain the same coloring agents as each other. Further, as the coloring agent, two or more kinds of coloring agents may be used.

Moreover, a constitution in which the heat seal layer 5 containing a coloring agent may also be accepted in place of or together with, for example, a constitution in which the anti-blocking layer 6 contains a coloring agent, or a constitution in which a colored layer is used as a function layer. In a case where the first transfer layer (10) has a single layer configuration consisting only of the heat seal layer 5, the heat seal layer 5 may contain various kinds of coloring agents.

Further, in order to improve the peelability of the first transfer layer (10) from the first substrate (1), a release layer (not shown) may be provided between the first substrate (1) and the first transfer layer (10). The release layer is a layer that does not constitute the first transfer layer (10), and a layer that remains on the first substrate (1) when the first transfer layer (10) is transferred onto the second transfer layer (210). Examples of the component contained in the release layer include waxes, silicone wax, a silicone resin, various kinds of silicone-modified resins such as a silicone-modified acrylic resin, a fluorine resin, a fluorine-modified resin, polyvinyl alcohol, an acrylic resin, a thermally crosslinkable epoxy-amino resin, a thermally crosslinkable alkyd-amino resin, a melamine resin, a cellulose resin, a urea resin, a polyolefin, a fibrous resin, and the like. The release layer may contain one component alone or may contain two or more components. The thickness of the release layer as an example is 0.1 μm or more and 1 μm or less.

The release layer in a preferred embodiment contains a modified polyolefin. The release layer contains the modified polyolefin in an amount of more preferably more than 30% by mass, and furthermore preferably 60% by mass or more, with respect to the total mass of the release layer. According to the thermal transfer sheet 100 having such a release layer, the peelability of the first transfer layer (10) from the first substrate (1) can be made good, and further the flacking resistance of a transfer layer can also be made good. Incidentally, by making the flacking resistance good, falling of a transfer layer can be suppressed, for example, in a case where bending stress is applied to a thermal transfer sheet. The upper limit value of the content of the modified polyolefin is not limited, and is 100% by mass. Further, in a case where the modified polyolefin is used in combination with a release auxiliary agent to be described later and an arbitrary component, the upper limit value as an example of the content of the modified polyolefin is 90% by mass or 95% by mass.

Examples of the modified polyolefin include an acid-modified polyolefin, a chlorinated polyolefin, and the like. Examples of the acid-modified polyolefin include unsaturated carboxylic acid, and a polyolefin modified with an anhydride of the unsaturated carboxylic acid. The modification mode is not limited, and graft modification or the like can be mentioned. Examples of the carboxylic acid or the anhydride thereof include maleic acid, maleic acid anhydride, acrylic acid, methacrylic acid, itaconic acid, itaconic acid anhydride, fumaric acid, crotonic acid, and the like.

Example of the olefin component constituting the modified polyolefin includes an alkene having 2 or more and 4 or less carbon atoms such as ethylene, propylene, 1-butene, 2-butene, 1-pentene, or 1-hexene. Among them, propylene is preferred. Further, the polyolefin component may also be a cyclic polyolefin.

The release layer in a more preferred embodiment contains a modified polyolefin having a melting point of 80° C. or more and 160° C. or less and in particular a melting point of higher than 100° C. and 130° C. or less, and contains an acid-modified polypropylene particularly preferably having a melting point of 80° C. or more and 160° C. or less and particularly a melting point of higher than 100° C. and 130° C. or less.

Moreover, the release layer containing a modified polyolefin may further contain a release auxiliary agent. Examples of the release auxiliary agent include polyvinyl alcohol, an alkyl-modified resin, a silicone-modified resin, polyethylene wax, silicone oil, and the like. In particular, polyvinyl alcohol as the release auxiliary agent is suitable in the point that the peelability of the first transfer layer (10) containing the heat seal layer 5 can be made good while maintaining the function of the heat seal layer positioned on the release layer.

The content of the release auxiliary agent is preferably 5% by mass or more and less than 70%, and more preferably 10% by mass or more and 40% or less, with respect to the total mass of the release layer.

Further, the modified polyolefin may also be a modified polyolefin crosslinked with a crosslinking agent.

(Coloring Material Layer)

Figure 3:
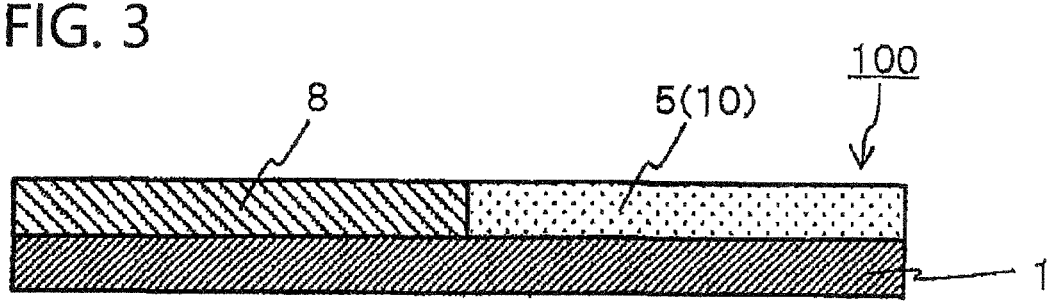
FIG. 3 is a schematic sectional view showing an example of a thermal transfer sheet of the present disclosure.

As shown in FIG. 3, the first transfer layer (10) and the coloring material layer 8 can also be disposed in any order on one surface of the first substrate (1) so as being frame sequentially. According to the thermal transfer sheet 100 in the embodiment shown in FIG. 3, the formation of the thermal transfer image 150 in the thermal transfer image formation step can be performed by the thermal transfer sheet 100 provided with the first transfer layer (10) (see FIG. 7A). That is, the formation of a thermal transfer image on the receiving layer 205 and the transfer of the first transfer layer (10) onto the second transfer layer (210) can be performed together. In this regard, in the illustrated embodiment, the first transfer layer (10) has a single layer structure consisting only of the heat seal layer 5; however, the first transfer layer (10) may be the multilayer structure containing the heat seal layer 5.

The coloring material component contained in the coloring material layer 8 is not particularly limited, and conventionally known coloring material components can be appropriately selected and used. For example, in a case where the formation of a thermal transfer image in the thermal transfer image formation step is performed by a sublimation-type thermal transfer method, the coloring material layer 8 contains a sublimation dye, and a binder resin.

As the sublimation dye, a dye having a sufficient color density and not discolored by light, heat, temperature or the like is preferred. Examples of the sublimation dye described above include a diarylmethane-based dye, a triarylmethane-based dye, a triazole-based dye, a merocyanine dye, a pyrazolone dye, a methine-based dye, an indoaniline-based dye, a pyrazolomethine-based dye, an azomethine-based dye such as acetophenone azomethine, pyrazolo azomethine, imidazole azomethine, imidazo azomethine, or pyridone azomethine, a xanthene-based dye, an oxazine-based dye, a cyanostyrene-based dye such as dicyanostyrene, and tricyanostyrene, a thiazine-based dye, an azine-based dye, an acridine-based dye, a benzene azo-based dye, an azo-based dye such as pyridone azo, thiophene azo, isothiazole azo, pyrrole azo, pyrazole azo, imidazole azo, thiadiazole azo, triazole azo, or disazo, a spiropyran-based dye, an indolinospiropyran-based dye, a fluoran-based dye, a rhodamine lactam dye, a naphthoquinone-based dye, an anthraquinone-based dye, a quinophthalone-based dye, and the like. Specifically, a red dye such as MSRedG (Mitsui Chemicals, Inc.), Macrolex Red Violet R (Bayer AG), CeresRed 7B (Bayer AG), or Samaron Red F3BS (Mitsubishi Chemical Corporation); a yellow dye such as Holon Brilliant yellow 6GL (Clariant AG), PTY-52 (Mitsubishi Chemical Corporation), or Macrolex yellow 6G (Bayer AG); a blue dye such as Kayaset (registered trademark) Blue 714 (Nippon Kayaku Co., Ltd.), Holon Brilliant Blue S-R (Clariant AG), MS Blue 100 (Mitsui Chemicals, Inc.), or C.I. Solvent Blue 63; or the like can be mentioned.

Examples of the binder resin include a cellulose resin such as an ethyl cellulose resin, a hydroxyethyl cellulose resin, an ethylhydroxy cellulose resin, a methyl cellulose resin, or a cellulose acetate resin; a vinyl resin such as polyvinyl alcohol, polyvinyl acetate, polyvinyl butyral, polyvinyl acetoacetal, or polyvinyl pyrrolidone; an acrylic resin such as poly(meth)acrylate, or poly(meth)acrylamide; polyurethane; polyamide; and polyester. Among them, a cellulose resin, a vinyl resin, an acrylic resin, polyurethane, polyester, and the like are preferred in terms of the heat resistance, the transferability of dye, or the like.

The coloring material layer 8 may contain an additive material such as inorganic fine particles, or organic fine particles. As the inorganic fine particles, fine particles of carbon black, silica, alumina, titanium dioxide, molybdenum disulfide or the like can be mentioned. As the organic fine particles, fine particles of polyethylene wax or the like can be mentioned. Moreover, the coloring material layer 8 may contain a release agent. As the release agent, a silicone oil, a phosphoric acid ester, a fluorine material or the like can be mentioned. Further, the coloring material layer may contain various kinds of curing agents such as isocyanate, an epoxy resin, and carbodiimide.

On the other hand, in a case where the formation of a thermal transfer image in the thermal transfer image formation step is performed by a melt-type thermal transfer method, the coloring material layer 8 contains a melt ink, and a binder resin. The melt ink can be appropriately selected from known organic or inorganic pigments, and known organic or inorganic dyes. The melt ink which has a sufficient color density, and is not color-changed or not discolored by light, heat or the like is preferred. The color of the melt ink is not limited to cyan, magenta, yellow and black, and coloring agents having various colors can be used.

Examples of the binder resin include an ethylene-vinyl acetate copolymer, an ethylene-acrylic acid ester copolymer, polyethylene, polystyrene, polypropylene, polybutene, a petroleum resin, polyvinyl chloride, a vinyl chloride-vinyl acetate copolymer, polyvinyl alcohol, a vinylidene chloride resin, a (meth)acrylic resin, polyamide, polycarbonate, a fluorine resin, polyvinyl formal, polyvinyl butyral, acetyl cellulose, nitrocellulose, polyvinyl acetate, polyisobutylene, ethyl cellulose, polyacetal, and the like. Moreover, microcrystalline wax, carnauba wax, paraffin wax, or the like may be used in combination. Further, Fischer-Tropsch wax, various kinds of polyethylenes with a low molecular weight, Japan wax, yellow beeswax, whale wax, insect wax, wool wax, shellac wax, candelilla wax, petrolactam, polyester wax, partially modified wax, or a wax component such as a fatty acid ester, or a fatty acid amide may be used in combination.

The content of the dye or pigment contained in the coloring material layer 8 is not particularly limited, and may be appropriately set depending on the kind of the dye or pigment to be used, or the kind of the binder resin to be used, in consideration of the density, storage stability or the like of a thermal transfer image. For example, the content of the sublimation dye with respect to the total mass of the binder resin contained in the coloring material layer 8 is preferably 15% by mass or more and 300% by mass or less.

In a forming method for the coloring material layer 8, a dye or pigment, and an additive material to be added as needed are added to an appropriate binder resin, the resultant mixture is dispersed or dissolved in an appropriate solvent to obtain a coating liquid, and by applying the coating liquid onto the first substrate (1), or an arbitrary layer provided on the first substrate (1) and drying the coating liquid, the coloring material layer 8 can be formed. The thickness of the coloring material layer 8 is not particularly limited, and is usually 0.2 μm or more and 5 μm or less.

In this regard, the thermal transfer sheet 100 in the shown embodiment shows an embodiment in which the single coloring material layer 8 is provided on one surface of the first substrate (1), but may have multiple coloring material layers 8 having hues different from each other, for example, a constitution in which a yellow coloring material layer, a magenta coloring material layer, a cyan coloring material layer, a black coloring material layer, and the like are disposed in any order can also be adopted.

Figure 4:
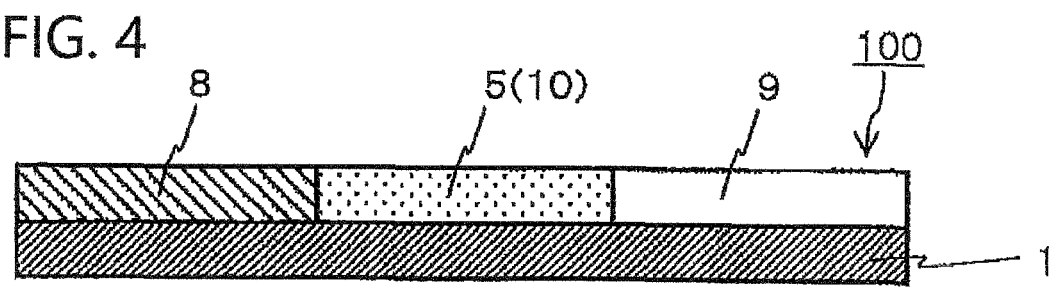
FIG. 4 is a schematic sectional view showing an example of a thermal transfer sheet of the present disclosure.

Moreover, as shown in FIG. 4, the first transfer layer (10) and a protective layer 9 can also be disposed in any order on one surface of the first substrate (1) (in the illustrated embodiment, the coloring material layer 8, the first transfer layer (10), and the protective layer 9 are disposed in any order on one surface of the first substrate (1)). Further, the constitution may be a constitution in which the embodiments shown in FIGS. 1 to 4 are appropriately combined.

(Back Face Layer)

Moreover, a back face layer (not shown) may be provided on the other surface of the first substrate (1). The back face layer can be formed by appropriately selecting a conventionally known thermoplastic resin or the like. Examples of the thermoplastic resin include polyester, a polyacrylic acid ester, polyvinyl acetate, a styrene acrylate resin, polyurethane, a polyolefin such as polyethylene, or polypropylene, polystyrene, polyvinyl chloride, polyether, polyamide, polyimide, polyamideimide, polycarbonate, polyacrylamide, polyvinyl chloride, polyvinyl butyral, a polyvinylacetal such as polyvinyl acetoacetal, and a silicone-modified product of these materials. In particular, from the viewpoint of the heat resistance and the like, polyamideimide or a silicone-modified product of the polyamideimide, or the like can be preferably used.

Further, in the back face layer, for the purpose of improving the slip properties, it is preferred in addition to the above-described thermoplastic resin to contain various kinds of additive materials such as a release agent of wax, higher fatty acid amide, a phosphoric acid ester compound, metal soap, silicone oil, a surfactant or the like, an organic powder of a fluorine resin or the like, inorganic particles of silica, clay, talc, calcium carbonate or the like, and it is particularly preferred to contain at least one kind of phosphoric acid ester or metal soap.

The back face layer can be formed, for example, by applying a coating liquid in which the thermoplastic resin and various kinds of additive materials to be added as needed are dispersed or dissolved in an appropriate solvent, onto the other surface of the first substrate (1), and drying the coating liquid. From the viewpoint of improving, for example, the heat resistance or the like, the thickness of the back face layer is preferably 0.1 or more and 5 µm or less, and more preferably 0.3 µm or more and 2 µm or less.

<Intermediate Transfer Medium Preparation Step>

Figure 8A:
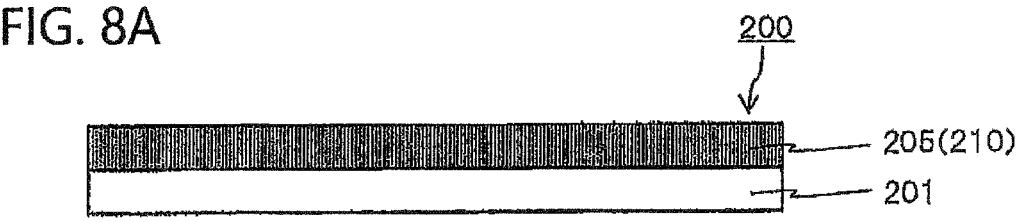
FIG. 8 is a schematic sectional view showing an example of an intermediate transfer medium to be used in the method for producing a printed material of the present disclosure.
Figure 8B:
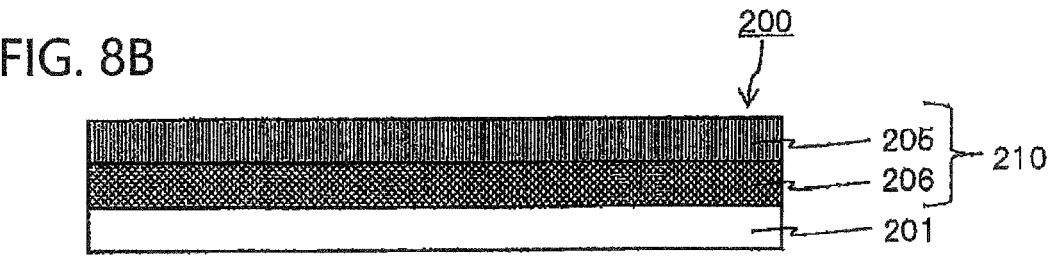

As shown in FIG. 8, an intermediate transfer medium preparation step is a step of preparing the intermediate transfer medium 200 in which the second transfer layer (210) having a single layer structure consisting only of the receiving layer 205 (see FIG. 8A), or the second transfer layer (210) having a multilayer structure formed by stacking two or more layers including the receiving layer 205, the receiving layer among the layers forming the multilayer structure, being positioned farthest from the second substrate (201) (see FIG. 8B) is provided on at least a part of one surface of the second substrate (201).

(Second Substrate)

The second substrate (201) is an essential component in the intermediate transfer medium 200, and holds the second transfer layer (210) provided on one surface of the second substrate (201). The material for the second substrate (201) is not particularly limited, and a material appropriately selected from the materials that have been described in the first substrate (1) of the thermal transfer sheet 100, and the like can be used.

(Second Transfer Layer)

As shown in FIG. 8, the second transfer layer (210) is provided on at least a part of one surface of the second substrate (201). The second transfer layer (210) may have a single layer structure consisting only of the receiving layer 205, or may have a multilayer structure formed by stacking two or more layers including the receiving layer 205. The second transfer layer (210) in the intermediate transfer medium 200 in the embodiment shown in FIG. 8B has the multilayer structure formed by stacking a peeling layer 206, and the receiving layer 205 in this order from the side of the second substrate (201). In this regard, in a case where the second transfer layer (210) has the multilayer structure, a layer positioned farthest from the second substrate (201) among the layers constituting the second transfer layer (210) is the receiving layer 205.

(Receiving Layer)

The receiving layer 205 constituting the second transfer layer (210) is positioned on the outermost surface of the intermediate transfer medium 200. The receiving layer 205 is not particularly limited, and any receiving layer 205 that is used in the field of the intermediate transfer medium can be used. The receiving layer 205 as an example contains a polyolefin such as polypropylene, a halogenated resin such as polyvinyl chloride, or polyvinylidene chloride, a vinyl resin such as polyvinyl acetate, a vinyl chloride-vinyl acetate copolymer, an ethylene-vinyl acetate copolymer, or a polyacrylic acid ester, a polyester such as polyethylene terephthalate or polybutylene terephthalate, polystyrene, polyamide, a copolymer of an olefin such as ethylene or propylene and another vinyl polymer, an ionomer, a cellulose resin such as cellulose diastase, polycarbonate, or the like. The receiving layer 205 in the preferred embodiment contains polyvinyl chloride, an acryl-styrene resin, and a polyester.

In the method for producing a printed material of the present disclosure, the second transfer layer (210) and the transfer-receiving body 300 do not take an embodiment in which the second transfer layer (210) and the transfer-receiving body 300 directly come into contact with each other, but the second transfer layer (210) is transferred onto the transfer-receiving body 300 with the first transfer layer (10) containing the heat seal layer 5 described above therebetween. Therefore, the receiving layer 205 in which the degree of freedom in the design has been increased can be obtained without taking a measure to enhance the adhesiveness between the second transfer layer (210) and the transfer-receiving body 300 with respect to the receiving layer 205. For example, in order to form a printed material having a high-density thermal transfer image, the receiving layer 205 of the intermediate transfer medium 200, which is designed so as to mainly focus on the dyeing property to a coloring material may be used.

The forming method for the receiving layer 205 is not particularly limited, and for example, by preparing a coating liquid for receiving layer in which the resin materials mentioned above are dissolved or dispersed in an appropriate solvent, and by applying the coating liquid onto the second substrate (201) or on an arbitrary layer that is provided on the second substrate (201), and drying the coating liquid, the receiving layer 205 can be formed. The thickness of the receiving layer 205 is not particularly limited, and is usually 1 µm or more and 10 µm or less.

(Peeling Layer)

As shown in FIG. 8B, in order to improve the peelability of the second transfer layer (210) when the second transfer layer (210) is transferred from the second substrate (201), the peeling layer 206 (that may also be referred to as a protective layer) can also be provided between the second substrate (201) and the receiving layer 205. In this regard, the peeling layer 206 constitutes the second transfer layer (210), and is positioned closest to the second substrate (201) among the layers constituting the second transfer layer (210).

The peeling layer 206 as an example contains waxes, silicone wax, a silicone resin, a silicone-modified resin, a fluorine resin, a fluorine-modified resin, polyvinyl alcohol, an acrylic resin, a thermally crosslinkable epoxy-amino resin, a thermally crosslinkable alkyd-amino resin, or the like. The peeling layer 206 may contain one kind of resin alone, or may contain two or more kinds of resins.

The forming method for the peeling layer 206 is not particularly limited, and by preparing a coating liquid for peeling layer in which the above-described resin is dissolved or dispersed in an appropriate solvent, and by applying the coating liquid onto the second substrate (201), and drying the coating liquid, the peeling layer 206 can be formed. The thickness of the peeling layer 206 is not particularly limited, and is preferably 0.5 µm or more and 5 µm or less.

<Thermal Transfer Image Formation Step>

As shown in FIGS. 5A and 6A, the thermal transfer image formation step is a step of forming a thermal transfer image on the receiving layer 205 of the intermediate transfer medium 200 prepared in the above.

Specifically, the thermal transfer image formation step is a step of forming the thermal transfer image 150 by superposing a receiving layer of the intermediate transfer medium 200 and the thermal transfer sheet (100 or 100A) having the coloring material layer 8 so that the receiving layer 205 and the coloring material layer 8 face each other, and by moving a coloring material component contained in the coloring material layer to the receiving layer 205, or by transferring the coloring material layer 8 onto the receiving layer 205, with the use of a heating means such as a thermal head.

As the thermal transfer sheet used in the thermal transfer image formation step, the thermal transfer sheet 100 in which the coloring material layer 8 and the first transfer layer (10) (see FIG. 6A) are disposed in any order on one surface of the first substrate (1), as described above, may be used, or the conventionally-known thermal transfer sheet 100 A (see FIG. 5A) that is different from the above thermal transfer sheet 100 and is provided with a coloring material layer may be used. In this regard, FIGS. 5 and 6 are different from each other only in the point that a thermal transfer image is formed by using a thermal transfer sheet provided with the first transfer layer (10) and the coloring material layer 8, or by using a thermal transfer sheet provided with the coloring material layer 8 and different from the thermal transfer sheet that is provided with the first transfer layer (10), and FIGS. 5 and 6 are the same as each other in the other points.

<First Transfer Step>

As shown in FIGS. 5B and 6B, the first transfer step is a step of combining the intermediate transfer medium 200 with the thermal transfer sheet 100, after the thermal transfer image formation step, and transferring the first transfer layer (10) of the thermal transfer sheet 100 onto the second transfer layer (210) of the intermediate transfer medium 200. Through the present step, an intermediate transfer medium in which the first transfer layer (10) is transferred onto the second transfer layer (210) so that the heat seal layer 5 is positioned on the outermost surface of the intermediate transfer medium is obtained.

For the transfer of the first transfer layer (10) of the thermal transfer sheet, in addition to a method of using a heating device such as a thermal head, for example, a hot stamping method, a heat roll method, or the like can be used. Further, the first transfer layer (10) can also be transferred by a method other than the above methods. The same applies to the transfer of the second transfer layer (210) in the second transfer step.

<Second Transfer Step>

As shown in FIGS. 5C and 6C, the second transfer step is a step of combining the intermediate transfer medium 200 in which the first transfer layer (10) is transferred onto the second transfer layer (210) with the transfer-receiving body 300, and transferring the second transfer layer (210) together with the first transfer layer (10) onto the transfer-receiving body 300. In other words, the second transfer step is a step of transferring the second transfer layer (210) of the intermediate transfer medium 200 onto the transfer-receiving body 300 with the first transfer layer (10) therebetween. By passing through the present step, the printed material 400 formed by stacking the first transfer layer (10), and the second transfer layer (210) containing the receiving layer 205 on which the thermal transfer image 150 is formed in this order on the transfer-receiving body 300 is obtained.

The transfer-receiving body 300 that is used in the method for producing a printed material of the present disclosure is not limited. Examples of the transfer-receiving body 300 include plain paper, high-quality paper, tracing paper, wood, a resin plate (may also be a film) of polycarbonate, an acrylic resin, an acrylonitrile-butadiene-styrene (ABS) resin, polyvinyl chloride, or the like, a metal plate of aluminum or the like, a glass plate, and a ceramic plate of pottery or the like. Further, an object having a predetermined image can also be used as the transfer-receiving body 300. Moreover, an object having a curvature can also be used as the transfer-receiving body 300.

As in the above, the method for producing a printed material of the present disclosure has been described specifically; however, in the method for producing a printed material of the present disclosure, the condition that the first transfer layer (10) of the thermal transfer sheet 100 includes the heat seal layer 5 containing one or both of (i) a polyester having a glass transition temperature (Tg) of 55° C. or more and a number average molecular weight (Mn) of 15000 or less, and (ii) a polyester having a glass transition temperature (Tg) of less than 55° C. has only to be satisfied, and various modifications can be performed as long as this condition is satisfied. For example, as the intermediate transfer medium 200, any intermediate transfer medium may also be used as long as the condition that the receiving layer 205 is contained is satisfied. The same applies to the transfer-receiving body 300. Further, after the second transfer step, a step of further transferring the protective layer 9 onto the printed material 400 obtained by transferring the second transfer layer (210) onto the transfer-receiving body 300 with the first transfer layer (10) therebetween may be included by using a thermal transfer sheet shown in FIG. 4, or by using a conventionally-known protective layer transfer sheet.

<<Thermal Transfer Sheet>>

Next, the thermal transfer sheet according to an embodiment of the present disclosure (hereinafter, referred to as a thermal transfer sheet of the present disclosure), will be specifically described. As shown in FIGS. 1 to 4, in the thermal transfer sheet 100 of the present disclosure, the transfer layer 10 is provided on at least a part of one surface of the substrate 1, and the transfer layer 10 has a single layer structure consisting only of the heat seal layer 5 or a multilayer structure formed by stacking two or more layers including the heat seal layer 5. In a case where the transfer layer 10 has the multilayer structure, in which the heat seal layer 5 among the layers constituting the transfer layer 10 is positioned closest to the substrate 1 is taken.

Further, in the thermal transfer sheet 100 of the present disclosure, the heat seal layer 5 constituting the transfer layer 10 contains one or both of (i) a polyester having a glass transition temperature (Tg) of 55° C. or more and a number average molecular weight (Mn) of 15000 or less, and (ii) a polyester having a glass transition temperature (Tg) of less than 55° C.

As the thermal transfer sheet 100 of the present disclosure, the thermal transfer sheet 100 that is prepared in the thermal transfer sheet preparation step in the method for producing a printed material of the present disclosure can be used as it is. Therefore, description of the specific constitution of the thermal transfer sheet 100 of the present disclosure will be omitted here. In this regard, the substrate 1 and the transfer layer 10 in the thermal transfer sheet 100 of the present disclosure correspond to the first substrate (1) and the first transfer layer (10), which have been described in the thermal transfer sheet 100 to be prepared in the thermal transfer sheet preparation step, respectively in the method for producing a printed material of the present disclosure.

In the method for producing a printed material of the present disclosure, an embodiment in which the first transfer layer (10) of the thermal transfer sheet 100 is transferred onto the second transfer layer (210) of the intermediate transfer medium 200 has been described; however, the thermal transfer sheet 100 of the present disclosure is not limited to this application, and can be applied to an application for improving the adhesiveness between a predetermined object (for example, an arbitrary article) and a predetermined medium when the predetermined medium is transferred onto the predetermined object. For example, when a protective layer of a protective layer transfer sheet as the predetermined medium is transferred onto a printed material as the predetermined object, the thermal transfer sheet 100 can also be used for the application for improving the adhesiveness between a printed material and a protective layer, that is, the thermal transfer sheet 100 can also be used as the thermal transfer sheet for transferring the first transfer layer (10) onto a protective layer of a protective layer transfer sheet. Moreover, the thermal transfer sheet 100 can be applied also to other applications. For example, in a case where a decorative sheet is used as a predetermined medium, or in a case where a medium of a single layer or a multilayer structure, which includes a glossy layer, a masking layer or the like, is used as a predetermined medium, and in a case where the predetermined medium and a predetermined object are integrated with each other, the thermal transfer sheet 100 can be also applied.

<<Combination of Intermediate Transfer Medium and Thermal Transfer Sheet>>

The combination of an intermediate transfer medium and a thermal transfer sheet, according to an embodiment of the present disclosure (hereinafter, referred to as a combination of the present disclosure), is a combination of an intermediate transfer medium and a thermal transfer sheet, which has been described in the method for producing a printed material of the present disclosure.

As the thermal transfer sheet and the intermediate transfer medium, which form the combination of the present disclosure, constitutions of the thermal transfer sheet 100 described in the thermal transfer sheet preparation step and the intermediate transfer medium 200 described in the intermediate transfer medium preparation step, in the method for producing a printed material of the present disclosure can be appropriately selected and used.

<<Decorative Material>>

Next, the decorative material according to an embodiment of the present disclosure (hereinafter, referred to as a decorative material of the present disclosure) will be specifically described. The decorative material of the present disclosure is a decorative material obtained by providing a decorative body for decorating a transfer-receiving body on the transfer-receiving body, in which the heat seal layer 5 is provided at a position in contact with the transfer-receiving body and between the transfer-receiving body and the decorative body, and the heat seal layer 5 contains one or both of (i) a polyester having a glass transition temperature (Tg) of 55° C. or more and a number average molecular weight (Mn) of 15000 or less, and (ii) a polyester having a glass transition temperature (Tg) of less than 55° C.

According to the decorative material of the present disclosure, the adhesiveness between the transfer-receiving body and the decorative body, which constitutes the decorative material, can be enhanced.

As the heat seal layer 5 constituting the decorative material of the present disclosure, the heat seal layer 5 described in the method for producing a printed material of the present disclosure can be used as it is. The same applies to the transfer-receiving body 300.

The decorative body constituting the decorative material of the present disclosure is not limited, and can be appropriately selected depending on the function required for the decorative material. As the decorative body, a conventionally known decorative sheet, the second transfer layer (210) on which the thermal transfer image described above is formed, or the like can be mentioned.

As the method for producing a decorative material of the present disclosure, it is not also particularly limited, and for example, a method in which the above-described coating liquid for heat seal layer is applied on one surface side of a decorative body, the coating liquid is dried to form the heat seal layer 5, and the transfer-receiving body 300 and a decorative body are integrated with each other with the heat seal layer 5 therebetween, or a method in which the first transfer layer (10) described in the method for producing a printed material of the present disclosure is transferred onto one surface side of a decorative body, and the transfer-receiving body 300 and a decorative body are integrated with each other with the first transfer layer (10) therebetween, can be mentioned.

In the specification of the present application, a resin and the like that constitute each layer are illustratively described; however, the resins may be homopolymers of the monomers constituting each of the resins, or may also be a copolymer of a monomer constituting each of the resins as the main component and another monomer or multiple other monomers, or a derivative thereof. For example, when referring to an acrylic resin, a monomer of acrylic acid or methacrylic acid, or a monomer of acrylic acid ester or methacrylic acid ester has only to be contained as the main component. Further, a modified product of these resins may also be accepted. Moreover, a resin other than those described in the specification of the present application may be used. Further, the resin and the like constituting each layer may be one kind or may also be two or more kinds.

EXAMPLES

Next, the present invention will be described more specifically by way of Examples and Comparative Examples. Hereinafter, the expression "part(s) or %" is on a mass basis unless otherwise specifically noted. Table 1 shows the summary of the kind of each of the coating liquids used for the formation of each of the layers that constitute thermal transfer sheets of Examples and Comparative Examples.

Example 1

By using a polyethylene terephthalate film having a thickness of 5 μm with an easily adhesive layer as a substrate, a coating liquid for release layer 1 having the following composition was applied onto the easily adhesive layer side of the substrate and dried so as to form a release layer having a thickness of 0.2 μm when being dried. Next, by applying a coating liquid for heat seal layer 1 having the following composition onto the release layer, and drying the coating liquid, a heat seal layer having a thickness of 1 μm when being dried was formed, and a thermal transfer sheet of Example 1 having the release layer and the heat seal layer in this order on the substrate was obtained. In this regard, the heat seal layer constitutes a first transfer layer referred to in the method for producing a printed material of the present disclosure (a transfer layer referred to in the thermal transfer sheet of the present disclosure).

<Coating Liquid for Release Layer 1>

| | |
|---|---|
| Polyvinyl alcohol (PVA-110, KURARAY CO., LTD.) | 10 parts |
| Water | 70 parts |
| Isopropyl alcohol | 20 parts |

<Coating Liquid for Heat Seal Layer 1>

| | |
|---|---|
| Polyester (Tg: 60° C., and Mn: 10000) (VYLON (registered trademark) GK250, TOYOBO CO., LTD.) | 20 parts |
| Methyl ethyl ketone | 40 parts |
| Toluene | 40 parts |

Example 2

A thermal transfer sheet of Example 2 was obtained all in a similar manner as in Example 1 except that the coating liquid for heat seal layer 1 was changed to a coating liquid for heat seal layer 2 having the following composition to form a heat seal layer.

<Coating Liquid for Heat Seal Layer 2>

| | |
|---|---|
| Polyester (Tg: 71° C., and Mn: 14000) (VYLON (registered trademark) 296, TOYOBO CO., LTD.) | 20 parts |
| Methyl ethyl ketone | 40 parts |
| Toluene | 40 parts |

Example 3

A thermal transfer sheet of Example 3 was obtained all in a similar manner as in Example 1 except that the coating liquid for heat seal layer 1 was changed to a coating liquid for heat seal layer 3 having the following composition to form a heat seal layer.

<Coating Liquid for Heat Seal Layer 3>

| | |
|---|---|
| Polyester (Tg: 47° C., and Mn: 16000) (VYLON (registered trademark) 600, TOYOBO CO., LTD.) | 20 parts |
| Methyl ethyl ketone | 40 parts |
| Toluene | 40 parts |

Example 4

A thermal transfer sheet of Example 4 was obtained all in a similar manner as in Example 1 except that the coating liquid for heat seal layer 1 was changed to a coating liquid for heat seal layer 4 having the following composition to form a heat seal layer.

<Coating Liquid for Heat Seal Layer 4>

| | |
|---|---|
| Polyester (Tg: 0° C., and Mn: 10000) (VYLON (registered trademark) GK180, TOYOBO CO., LTD.) | 20 parts |
| Methyl ethyl ketone | 40 parts |
| Toluene | 40 parts |

Example 5

A thermal transfer sheet of Example 5 was obtained all in a similar manner as in Example 1 except that the coating liquid for heat seal layer 1 was changed to a coating liquid for heat seal layer 5 having the following composition to form a heat seal layer.

<Coating Liquid for Heat Seal Layer 5>

| | |
|---|---|
| Polyester (Tg: 71° C., and Mn: 14000) (VYLON (registered trademark) 296, TOYOBO CO., LTD.) | 10 parts |
| Polyester (Tg: 0° C., and Mn: 10000) (VYLON (registered trademark) GK180, TOYOBO CO., LTD.) | 10 parts |
| Methyl ethyl ketone | 40 parts |
| Toluene | 40 parts |

Example 6

By using a polyethylene terephthalate film having a thickness of 5 μm with an easily adhesive layer as a substrate, a coating liquid for release layer 1 having the above composition was applied on the easily adhesive layer side of the substrate and dried so as to form a release layer having a thickness of 0.2 μm when being dried. Next, a coating liquid for heat seal layer 3 having above composition was applied onto the release layer and dried so as to form a heat seal layer having a thickness of 1 μm when being dried. Next, a coating liquid for anti-blocking layer 1 having the following composition was applied onto the heat seal layer and dried so as to form an anti-blocking layer having a thickness of 0.4 μm when being dried, and a thermal transfer sheet of Example 6 having the release layer, the heat seal layer, and the anti-blocking layer in this order on the substrate was obtained. In this regard, the heat seal layer and the anti-blocking layer constitute a first transfer layer (a transfer layer referred to in the thermal transfer sheet of the present disclosure) referred to in the method for producing a printed material of the present disclosure.

<Coating Liquid for Anti-Blocking Layer 1>

| | |
|---|---|
| Polyester (Tg: 71° C., and Mn: 14000) (VYLON (registered trademark) 296, TOYOBO CO., LTD.) | 20 parts |
| Methyl ethyl ketone | 40 parts |
| Toluene | 40 parts |

Example 7

A thermal transfer sheet of Example 7 was obtained all in a similar manner as in Example 6 except that the coating liquid for heat seal layer 3 was changed to a coating liquid for heat seal layer 4 having the above composition to form a heat seal layer.

Example 8

A thermal transfer sheet of Example 8 was obtained all in a similar manner as in Example 6 except that the coating liquid for heat seal layer 3 was changed to a coating liquid for heat seal layer 4 having the above composition to form a heat seal layer, and the coating liquid for anti-blocking layer 1 was changed to a coating liquid for anti-blocking layer 2 having the following composition to form an anti-blocking layer.

<Coating Liquid for Anti-Blocking Layer 2>

| | |
|---|---|
| Vinyl chloride-vinyl acetate copolymer (Tg: 76° C., and Mn: 12000) (SOLBIN (registered trademark) CNL, Nissin Chemical Industry Co., Ltd.) | 20 parts |
| Methyl ethyl ketone | 40 parts |
| Toluene | 40 parts |

Example 9

A thermal transfer sheet of Example 9 was obtained all in a similar manner as in Example 6 except that the coating liquid for heat seal layer 3 was changed to a coating liquid for heat seal layer 4 having the above composition to form a heat seal layer, and the coating liquid for anti-blocking layer 1 was changed to a coating liquid for anti-blocking layer 3 having the following composition to form an anti-blocking layer.

<Coating Liquid for Anti-Blocking Layer 3>

| | |
|---|---|
| Acrylic resin (Tg: 105° C., and Mn: 15000) (Dianal (registered trademark) BR-87, Mitsubishi Chemical Corporation) | 20 parts |
| Methyl ethyl ketone | 40 parts |
| Toluene | 40 parts |

Example 10

A thermal transfer sheet of Example 10 was obtained all in a similar manner as in Example 6 except that the coating liquid for heat seal layer 3 was changed to a coating liquid for heat seal layer 5 having the above composition to form a heat seal layer.

Example 11

A thermal transfer sheet of Example 11 was obtained all in a similar manner as in Example 6 except that the coating liquid for heat seal layer 3 was changed to a coating liquid for heat seal layer 1 having the above composition to form a heat seal layer, and the coating liquid for anti-blocking layer 1 was changed to a coating liquid for anti-blocking layer 3 having the above composition to form an anti-blocking layer.

Example 12

A thermal transfer sheet of Example 12 was obtained all in a similar manner as in Example 6 except that a coating liquid for release layer 2 having the following composition was applied in place of the coating liquid for release layer 1 and was dried so as to form a release layer having a thickness of 0.5 µm when being dried, the coating liquid for heat seal layer 3 was changed to a coating liquid for heat seal layer 1 having the above composition to form a heat seal layer, and the coating liquid for anti-blocking layer 1 was changed to a coating liquid for anti-blocking layer 3 having the above composition to form an anti-blocking layer.

<Coating Liquid for Release Layer 2>

| | |
|---|---|
| Acid-modified polyolefin (solid content: 30%) (HARDLEN (registered trademark) NZ-1015, TOYOBO CO., LTD. ) | 30 parts |
| Water | 35 parts |
| Isopropyl alcohol | 35 parts |

Example 13

A thermal transfer sheet of Example 13 was obtained all in a similar manner as in Example 6 except that a coating liquid for release layer 2 having the above composition was applied in place of the coating liquid for release layer 1 and was dried so as to form a release layer having a thickness of 0.5 µm when being dried, the coating liquid for heat seal layer 3 was changed to a coating liquid for heat seal layer 4 having the above composition to form a heat seal layer, and the coating liquid for anti-blocking layer 1 was changed to a coating liquid for anti-blocking layer 3 having the above composition to form an anti-blocking layer.

Example 14

A thermal transfer sheet of Example 14 was obtained all in a similar manner as in Example 6 except that a coating liquid for release layer 2 having the above composition was applied in place of the coating liquid for release layer 1 and was dried so as to form a release layer having a thickness of 0.5 µm when being dried, the coating liquid for heat seal layer 3 was changed to a coating liquid for heat seal layer 1 having the above composition to form a heat seal layer, and a coating liquid for anti-blocking layer 4 having the following composition was applied in place of the coating liquid for anti-blocking layer 1 and was dried so as to form an anti-blocking layer having a thickness of 3 µm when being dried.

<Coating Liquid for Anti-Blocking Layer 4>

| | |
|---|---|
| Vinyl chloride-vinyl acetate copolymer (Tg: 76° C., and Mn: 12000) (SOLBIN (registered trademark) CNL, Nissin Chemical Industry Co., Ltd.) | 10 parts |
| Titanium oxide | 30 parts |
| Methyl ethyl ketone | 30 parts |
| Toluene | 30 parts |

Example 15

A thermal transfer sheet of Example 15 was obtained all in a similar manner as in Example 6 except that a coating liquid for release layer 2 having the above composition was applied in place of the coating liquid for release layer 1 and was dried so as to form a release layer having a thickness of 0.5 µm when being dried, the coating liquid for heat seal layer 3 was changed to a coating liquid for heat seal layer 1 having the above composition to form a heat seal layer, and a coating liquid for anti-blocking layer 5 having the following composition was applied in place of the coating liquid for anti-blocking layer 1 and was dried so as to form an anti-blocking layer having a thickness of 1 µm when being dried.

<Coating Liquid for Anti-Blocking Layer 5>

| | |
|---|---|
| Vinyl chloride-vinyl acetate copolymer (Tg: 76° C., and Mn: 12000) (SOLBIN (registered trademark) CNL, Nissin Chemical Industry Co., Ltd.) | 15 parts |
| Aluminum pigment | 15 parts |
| Methyl ethyl ketone | 35 parts |
| Toluene | 35 parts |

Example 16

A thermal transfer sheet of Example 16 was obtained all in a similar manner as in Example 6 except that a coating liquid for release layer 2 having the above composition was applied in place of the coating liquid for release layer 1 and was dried so as to form a release layer having a thickness of 0.5 μm when being dried, the coating liquid for heat seal layer 3 was changed to a coating liquid for heat seal layer 1 having the above composition to form a heat seal layer, a coating liquid for anti-blocking layer 6 having the following composition was applied in place of the coating liquid for anti-blocking layer 1 and was dried so as to form a first anti-blocking layer having a thickness of 3 μm when being dried, and a coating liquid for anti-blocking layer 7 having the following composition was applied onto the first anti-blocking layer and was dried so as to form a second anti-blocking layer having a thickness of 1.5 μm when being dried.

<Coating Liquid for Anti-Blocking Layer 6>

| | |
|---|---|
| Vinyl chloride-vinyl acetate copolymer (Tg: 76° C., and Mn: 12000) (SOLBIN (registered trademark) CNL, Nissin Chemical Industry Co., Ltd.) | 15 parts |
| Silver pearl pigment (PEARL-GLAZE (registered trademark) MM-100R, NIHON KOKEN KOGYO CO., LTD.) | 15 parts |
| Methyl ethyl ketone | 35 parts |
| Toluene | 35 parts |

<Coating Liquid for Anti-Blocking Layer 7>

| | |
|---|---|
| Vinyl chloride-vinyl acetate copolymer (Tg: 76° C., and Mn: 12000) (SOLBIN (registered trademark) CNL, Nissin Chemical Industry Co., Ltd.) | 15 parts |
| Carbon black | 15 parts |
| Methyl ethyl ketone | 35 parts |
| Toluene | 35 parts |

Example 17

A thermal transfer sheet of Example 17 was obtained all in a similar manner as in Example 1 except that the coating liquid for heat seal layer 1 was changed to a coating liquid for heat seal layer 6 having the following composition to form a heat seal layer.

<Coating Liquid for Heat Seal Layer 6>

| | |
|---|---|
| Polyester (Tg: 20° C., and Mn: 13000) (VYLON (registered trademark) GK150, TOYOBO CO., LTD.) | 20 parts |
| Methyl ethyl ketone | 40 parts |
| Toluene | 40 parts |

Example 18

A thermal transfer sheet of Example 18 was obtained all in a similar manner as in Example 1 except that the coating liquid for heat seal layer 1 was changed to a coating liquid for heat seal layer 7 having the following composition to form a heat seal layer.

<Coating Liquid for Heat Seal Layer 7>

| | |
|---|---|
| Polyester (Tg: 36° C., and Mn: 11000) (VYLON (registered trademark) GK780, TOYOBO CO., LTD.) | 20 parts |
| Methyl ethyl ketone | 40 parts |
| Toluene | 40 parts |

Comparative Example 1

A thermal transfer sheet of Comparative Example 1 was obtained all in a similar manner as in Example 1 except that the coating liquid for heat seal layer 1 was changed to a coating liquid for heat seal layer A having the following composition to form a heat seal layer.

<Coating Liquid for Heat Seal Layer A>

| | |
|---|---|
| Polyester (Tg: 72° C., and Mn: 22000) (VYLON (registered trademark) 290, TOYOBO CO., LTD.) | 20 parts |
| Methyl ethyl ketone | 40 parts |
| Toluene | 40 parts |

Comparative Example 2

A thermal transfer sheet of Comparative Example 2 was obtained all in a similar manner as in Example 1 except that the coating liquid for heat seal layer 1 was changed to a coating liquid for heat seal layer B having the following composition to form a heat seal layer.

<Coating Liquid for Heat Seal Layer B>

| | |
|---|---|
| Polyester (Tg: 84° C., and Mn: 18000) (VYLON (registered trademark) GK880, TOYOBO CO., LTD.) | 20 parts |
| Methyl ethyl ketone | 40 parts |
| Toluene | 40 parts |

Comparative Example 3

A thermal transfer sheet of Comparative Example 3 was obtained all in a similar manner as in Example 1 except that the coating liquid for heat seal layer 1 was changed to a coating liquid for heat seal layer C having the following composition to form a heat seal layer.

<Coating Liquid for Heat Seal Layer C>

| | |
|---|---|
| Vinyl chloride-vinyl acetate copolymer (Tg: 76° C., and Mn: 12000) (SOLBIN (registered trademark) CNL, Nissin Chemical Industry Co., Ltd.) | 20 parts |
| Methyl ethyl ketone | 40 parts |
| Toluene | 40 parts |

Comparative Example 4

A thermal transfer sheet of Comparative Example 4 was obtained all in a similar manner as in Example 1 except that the coating liquid for heat seal layer 1 was changed to a coating liquid D for a heat seal layer having the following composition to form a heat seal layer.

<Coating Liquid for Heat Seal Layer D>

| | |
|---|---|
| Acrylic resin (Tg: 105° C., and Mw: 15000) (Dianal (registered trademark) BR-87, Mitsubishi Chemical Corporation) | 20 parts |
| Methyl ethyl ketone | 40 parts |
| Toluene | 40 parts |

TABLE 1

| | Coating liquid for release layer | Coating liquid for heat seal layer | Coating liquid for anti-blocking layer |
|---|---|---|---|
| Example 1 | 1 | 1 | None |
| Example 2 | 1 | 2 | None |
| Example 3 | 1 | 3 | None |
| Example 4 | 1 | 4 | None |
| Example 5 | 1 | 5 | None |
| Example 6 | 1 | 3 | 1 |
| Example 7 | 1 | 4 | 1 |
| Example 8 | 1 | 4 | 2 |
| Example 9 | 1 | 4 | 3 |
| Example 10 | 1 | 5 | 1 |
| Example 11 | 1 | 1 | 3 |
| Example 12 | 2 | 1 | 3 |
| Example 13 | 2 | 4 | 3 |
| Example 14 | 2 | 1 | 4 |
| Example 15 | 2 | 1 | 5 |
| Example 16 | 2 | 1 | 6 (First anti-blocking layer) 7 (Second anti-blocking layer) |
| Example 17 | 1 | 6 | None |
| Example 18 | 1 | 7 | None |
| Comparative Example 1 | 1 | A | None |
| Comparative Example 2 | 1 | B | None |
| Comparative Example 3 | 1 | C | None |
| Comparative Example 4 | 1 | D | None |

(Preparation of Intermediate Transfer Medium)

By using a polyethylene terephthalate film having a thickness of 16 μm as a support, a coating liquid for peeling layer having the following composition was applied onto the support and was dried so as to form a peeling layer having a thickness of 1 μm when being dried. Next, a coating liquid for protective layer having the following composition was applied onto the peeling layer and was dried so as to form a protective layer having a thickness of 2 μm when being dried. Further, a coating liquid for receiving layer having the following composition was applied onto the protective layer and was dried so as to form a receiving layer having a thickness of 1.5 μm when being dried, and as a result, an intermediate transfer medium formed by stacking the peeling layer, the protective layer, and the receiving layer in this order on the support was obtained. In this regard, the peeling layer, the protective layer, and the receiving layer constitute a second transfer layer in the method for producing a printed material of the present disclosure.

<Coating Liquid for Peeling Layer>

| | |
|---|---|
| Acrylic resin (Dianal (registered trademark) BR-87, Mitsubishi Chemical Corporation) | 29 parts |
| Polyester (VYLON (registered trademark) 200, TOYOBO CO., LTD.) | 1 part |
| Methyl ethyl ketone | 35 parts |
| Toluene | 35 parts |

<Coating Liquid for Protective Layer>

| | |
|---|---|
| Polyester (VYLON (registered trademark) 200, TOYOBO CO., LTD.) | 30 parts |
| Methyl ethyl ketone | 35 parts |
| Toluene | 35 parts |

<Coating Liquid for Receiving Layer>

| | |
|---|---|
| Vinyl chloride-vinyl acetate copolymer (SOLBIN (registered trademark) CNL, Nissin Chemical Industry Co., Ltd.) | 20 parts |
| Silicone oil (X-22-3000T, Shin-Etsu Chemical Co., LTD.) | 1 part |
| Methyl ethyl ketone | 79 parts |

(Preparation of Thermal Transfer Sheet Having Coloring Material Layer)

By using a polyethylene terephthalate film having a thickness of 5 μm as a substrate, a coating liquid for back face layer having the following composition was applied and dried so as to form a back face layer having a thickness of 1 μm when being dried. Next, a coating liquid for dye primer layer having the following composition was applied onto the other surface of the substrate and was dried so as to form a dye primer layer having a thickness of 0.15 μm when being dried. Coating liquids for yellow, magenta, and cyan coloring material layers having the following compositions were applied onto the dye primer layer frame sequentially so as to form a yellow coloring material layer, a magenta coloring material layer, and a cyan coloring material layer each having a thickness of 0.7 μm when being dried, and as a result, a thermal transfer sheet having coloring material layers was formed.

<Coating Liquid for Back Face Layer>

| | |
|---|---|
| Polyvinylacetal (S-LEC (registered trademark) BX-1, SEKISUI CHEMICAL CO., LTD.) | 2 parts |
| Polyisocyanate (BURNOCK (registered trademark) D750, DIC Corporation) | 9.2 parts |
| Phosphoric acid ester-based surfactant (PLYSURF (registered trademark) A208N, Dai-ichi Kogyo Seiyaku Co., LTD.) | 1.3 parts |

| | |
|---|---|
| Talc (MICRO ACE (registered trademark) P-3, Nippon Talc Co., Ltd.) | 0.3 part |
| Toluene | 43.6 parts |
| Methyl ethyl ketone | 43.6 parts |

<Coating Liquid for Dye Primer Layer>

| | |
|---|---|
| Colloidal alumina (solid content: 10.5%) (ALUMINASOL 200, Nissan Chemical Industries, LTD.) | 3.5 parts |
| Vinyl acetate-vinylpyrrolidone copolymer (PVP/VA E-335, ISP Japan Ltd.) | 1.5 parts |
| Water | 47.5 parts |
| Isopropyl alcohol | 47.5 parts |

<Coating Liquid for Yellow Coloring Material Layer>

| | |
|---|---|
| Solvent yellow 93 | 2.5 parts |
| Disperse yellow 201 | 2.5 parts |
| Polyvinylacetal (S-LEC (registered trademark) KS-5, SEKISUI CHEMICAL CO., LTD.) | 4 parts |
| Organic modified silicone oil | 0.04 part |
| Toluene | 50 parts |
| Methyl ethyl ketone | 50 parts |

<Coating Liquid for Magenta Coloring Material Layer>

| | |
|---|---|
| Disperse red 60 | 3 parts |
| Disperse violet 26 | 3 parts |
| Polyvinylacetal (S-LEC (registered trademark) KS-5, SEKISUI CHEMICAL CO., LTD.) | 5 parts |
| Organic modified silicone oil | 0.05 part |
| Toluene | 50 parts |
| Methyl ethyl ketone | 50 parts |

<Coating Liquid for Cyan Coloring Material Layer>

| | |
|---|---|
| Solvent blue 63 | 3 parts |
| Disperse blue 354 | 4 parts |
| Polyvinylacetal (S-LEC (registered trademark) KS-5, SEKISUI CHEMICAL CO., LTD.) | 5 parts |
| Organic modified silicone oil | 0.05 part |
| Toluene | 50 parts |
| Methyl ethyl ketone | 50 parts |

(Preparation of Transfer-Receiving Body)

As a transfer-receiving body, a card substrate made of vinyl chloride (Dai Nippon Printing Co., Ltd.) was prepared.

(Formation of Thermal Transfer Image)

The above-prepared thermal transfer sheet having coloring material layers and the above-prepared intermediate transfer medium were combined, and a gray image (image gradations: 128/256) was formed on a receiving layer of the intermediate transfer medium by the following printer.

(Printer)

Thermal head: KEE-57-12GAN2-STA (KYOCERA Corporation) Average resistance value of electric heating element: 3303(Ω)

Printing resolution in main scanning direction: 300 (dpi)
Printing resolution in sub-scanning direction: 300 (dpi)
Line cycle: 3.0 (msec./line)
Printing start temperature: 35(° C.)
Pulse Duty ratio: 85(%)
Printing voltage: 18.0 (V)

(Transfer of Transfer Layer (First Transfer Layer) of Thermal Transfer Sheet)

By using the above-described printer, energy in 55/255 gradations (energy gradations) was applied to a transfer layer (first transfer layer) of a thermal transfer sheet of each of Examples and Comparative Examples, and the transfer Layer (first transfer layer) of each of Examples and Comparative Examples was transferred onto the above-described intermediate transfer medium on which a gray image had been formed.

(Transfer of Transfer Layer (Second Transfer Layer) of Intermediate Transfer Medium)

By using a laminator for card (Dai Nippon Printing Co., Ltd.), a second transfer layer of an intermediate transfer medium was transferred onto the transfer-receiving body prepared in the above together with a first transfer layer transferred onto the second transfer layer. That is, on the transfer-receiving body, a second transfer layer of an intermediate transfer medium onto which an image had been formed was transferred with a first transfer layer of a thermal transfer sheet of each of Examples and Comparative Examples therebetween, and a printed material of each of Examples, and Comparative Examples was obtained. The printed materials were produced under the following four conditions (the following transfer conditions 1 to 4) of:

Transfer condition 1: 140° C., and 20 mm/sec.
Transfer condition 2: 150° C., and 20 mm/sec.
Transfer condition 3: 160° C., and 20 mm/sec.
Transfer condition 4: 175° C., and 20 mm/sec.

(Evaluation of Transferability and Adhesiveness)

For each of the printed materials of Examples and Comparative Examples, which had been produced by transferring transfer layers (second transfer layers) of intermediate transfer media onto objects to be transferred under the above transfer conditions 1 to 4, it was visually confirmed that a second transfer layer was transferred onto the overall the transfer-receiving body with a first transfer layer therebetween. Next, tape (Scotch (registered trademark) Tape BK-24, 3M Company) was stuck on a surface of each of these printed materials (surfaces of second transfer layers) of Examples and Comparative Examples, the states of the first transfer layer and the second transfer layer when the tape was peeled off were checked, and the evaluation of the transferability and adhesiveness was made on the basis of the following evaluation criteria. Evaluation results are shown in Table 1. In this regard, in the following evaluation criteria, in a case where the first transfer layer and the second transfer layer both remained on the transfer-receiving body side when the tape was peeled off, the case was evaluated that the "transfer was able to be performed with good adhesiveness".

"Evaluation Criteria"

A: Transfer was able to be performed with good adhesiveness under the transfer condition 1.
B: Transfer was not able to be performed with good adhesiveness under the transfer condition 1, but the transfer was able to be performed with good adhesiveness under the transfer condition 2.
C: Transfer was not able to be performed with good adhesiveness under the transfer conditions 1 and 2, but the transfer was able to be performed with good adhesiveness under the transfer condition 3.

NG: Transfer was not able to be performed with good adhesiveness under any of the transfer conditions 1 to 4.

(Durability Evaluation)

Each of the thermal transfer sheets of Examples and Comparative Examples was immersed in isopropyl alcohol (IPA) for 24 hours, and then a tape peeling test was performed by using tape (Scotch (registered trademark) Tape BK-24, 3M Company), and the durability evaluation was made on the basis of the following evaluation criteria. Evaluation results are shown in Table 2.

"Evaluation Criteria"
A: Transfer layer was not peeled off at all.
B: Transfer layer was slightly peeled off at a dot-level of the peeled amount.
C: Transfer layer was largely peeled off.

(Curl Evaluation)

Each of the printed materials of Examples that had been produced under the above transfer conditions 2, 3, and 4 was visually observed, and the curl evaluation was made on the basis of the following evaluation criteria. Evaluation results are shown in Table 2. In this regard, the printed material of Example 2 that had been produced under the above transfer condition 2, and the printed materials of Comparative Examples that had been produced under the above transfer conditions 2 to 4 were excluded from the curl evaluation because the adhesiveness of each of the printed materials was not good according to the above-described evaluation of transferability and adhesiveness.

"Evaluation Criteria"
A: Curl was 1 mm or less.
B: Curl was larger than 1 mm and 3 mm or less.
C: Curl was larger than 3 mm.
Not evaluated: Excluded from the targets of curl evaluation.

(Storage Stability Evaluation)

Each of the thermal transfer sheets of Examples and Comparative Examples that had been cut out into pieces of 10 cm×10 cm in size, and a polyethylene terephthalate film having a thickness of 5 μm were superposed so that a first transfer layer (transfer layer) of the thermal transfer sheet and the polyethylene terephthalate film came into contact with each other. Next, by using a constant load compression testing machine (Toyo Seiki Seisaku-Sho, Ltd.), a load of 1.96 MPa (20 kg/cm$^2$) was applied to each of the thermal transfer sheets of Examples and Comparative Examples, which had been superposed on the polyethylene terephthalate film, and each of the thermal transfer sheets with the load superposed on the polyethylene terephthalate films was stored for 100 hours under a dry environment of 50° C. Occurrence of blocking after storage was visually observed, and the storage stability evaluation was made on the basis of the following evaluation criteria. Evaluation results are shown in Table 2.

"Evaluation Criteria"
A: Blocking does not occur.
B: Sticking slightly occurs, but it is at a level that there is no problem in use.
C: Sticking largely occurs, and it is at a level that there is a problem in use.

(Flacking Resistance Evaluation)

When each of the thermal transfer sheets of Examples and Comparative Examples was folded, the presence or absence of flacking of a transfer layer was visually observed for evaluation of the flacking resistance evaluation of the transfer layer. The evaluation was made on the basis of the following evaluation criteria. Evaluation results are shown in Table 2.

"Evaluation Criteria"
A: Flacking of the transfer layer was not observed at all.
B: Flacking of the transfer layer was partially observed, but it was at a level that there was no problem in use.
C: Flacking of the transfer layer was largely observed, and it was at a level that there was a concern about a problem in use.

TABLE 2

|  | Evaluation of transferability and adhesiveness | Durability evaluation | Curl evaluation | | | Storage stability evaluation | Flacking resistance evaluation |
| --- | --- | --- | --- | --- | --- | --- | --- |
|  |  |  | Condition 2 | Condition 3 | Condition 4 |  |  |
| Example 1 | B | A | A | A | C | B | B |
| Example 2 | C | A | Not evaluated | A | C | A | A |
| Example 3 | A | B | A | A | C | C | B |
| Example 4 | A | C | A | A | C | C | C |
| Example 5 | A | B | A | A | C | C | B |
| Example 6 | A | B | A | A | C | A | B |
| Example 7 | A | C | A | A | C | A | B |
| Example 8 | A | C | A | A | C | A | B |
| Example 9 | A | C | A | A | C | A | C |
| Example 10 | A | B | A | A | C | A | B |
| Example 11 | B | A | A | A | C | A | B |
| Example 12 | B | A | A | A | C | A | A |
| Example 13 | A | C | A | A | C | A | A |
| Example 14 | B | A | A | A | C | A | A |
| Example 15 | B | A | A | A | C | A | A |
| Example 16 | B | A | A | A | C | C | A |
| Example 17 | A | C | A | A | C | C | C |
| Example 18 | A | B | A | A | C | A | B |
| Comparative Example 1 | NG | Not evaluated | Not evaluated | Not evaluated | Not evaluated | A | A |
| Comparative Example 2 | NG | Not evaluated | Not evaluated | Not evaluated | Not evaluated | A | A |
| Comparative Example 3 | NG | Not evaluated | Not evaluated | Not evaluated | Not evaluated | A | A |
| Comparative Example 4 | NG | Not evaluated | Not evaluated | Not evaluated | Not evaluated | A | B |

REFERENCE SIGNS LIST

100 Thermal transfer sheet
1 First substrate, substrate
10 First transfer layer, transfer layer
5 Heat seal layer
6 Anti-blocking layer
8 Coloring material layer
9 Protective layer
200 Intermediate transfer medium
201 Second substrate
205 Receiving layer
206 Peeling layer
210 Second transfer layer
300 Transfer-receiving body
400 Printed material

The invention claimed is:

1. A thermal transfer sheet, comprising:
   a substrate; and
   a transfer layer provided on at least a part of one surface of the substrate,
   wherein the transfer layer has a single layer structure consisting only of a heat seal layer, or a multilayer structure formed by stacking two or more layers including the heat seal layer,
   wherein, in a case where the transfer layer has the multilayer structure, the heat seal layer among the layers constituting the transfer layer is positioned closest to the substrate,
   wherein the heat seal layer contains one or both of (i) a polyester having a glass transition temperature (Tg) of 55° C. or more and a number average molecular weight (Mn) of 15000 or less, and (ii) a polyester having a glass transition temperature (Tg) of less than 55° C.,
   wherein the transfer layer contains an anti-blocking layer containing a coloring agent,
   wherein, among the layers constituting the transfer layer, the anti-blocking layer is positioned farthest from the substrate, and
   wherein the anti-blocking layer contains a resin component having a glass transition temperature (Tg) of 55° C. or more and a number average molecular weight (Mn) of 20000 or less.

2. The thermal transfer sheet according to claim 1, wherein the transfer layer and a coloring material layer are disposed in any order on one surface of the substrate.

3. The thermal transfer sheet according to claim 1, further comprising a release layer between the substrate and the transfer layer,
   wherein the release layer contains a modified polyolefin.

4. A combination of an intermediate transfer medium and a thermal transfer sheet, wherein the thermal transfer sheet is the thermal transfer sheet according to claim 1.

5. The thermal transfer sheet according to claim 2, further comprising a release layer between the substrate and the transfer layer,
   wherein the release layer contains a modified polyolefin.

6. A combination of an intermediate transfer medium and a thermal transfer sheet, wherein the thermal transfer sheet is the thermal transfer sheet according to claim 2.

7. A combination of an intermediate transfer medium and a thermal transfer sheet, wherein the thermal transfer sheet is the thermal transfer sheet according to claim 3.

8. A method for producing a printed material, comprising:
   preparing a thermal transfer sheet in which a first transfer layer having a single layer structure consisting only of a heat seal layer, or a first transfer layer having a multilayer structure formed by stacking two or more layers including a heat seal layer, the heat seal layer among the layers forming the multilayer structure, being positioned closest to a first substrate, is provided on at least a part of one surface of the first substrate;
   preparing an intermediate transfer medium in which a second transfer layer having a single layer structure consisting only of a receiving layer, or a second transfer layer having a multilayer structure formed by stacking two or more layers including a receiving layer, the receiving layer among the layers forming the multilayer structure, being positioned farthest from a second substrate, is provided on at least a part of one surface of the second substrate;
   forming a thermal transfer image on the receiving layer of the intermediate transfer medium;
   combining the intermediate transfer medium with the thermal transfer sheet, and transferring the first transfer layer of the thermal transfer sheet onto the second transfer layer of the intermediate transfer medium; and
   combining the intermediate transfer medium onto which the first transfer layer is transferred with a transfer-receiving body, and transferring the second transfer layer together with the first transfer layer onto the transfer-receiving body, wherein
   the heat seal layer of the thermal transfer sheet contains one or both of (i) a polyester having a glass transition temperature (Tg) of 55° C. or more and a number average molecular weight (Mn) of 15000 or less, and (ii) a polyester having a glass transition temperature (Tg) of less than 55° C.

9. The method for producing a printed material according to claim 8, wherein the thermal transfer sheet is a thermal transfer sheet in which a coloring material layer and the first transfer layer are disposed in any order on the one surface of the first substrate, and
   in forming the thermal transfer image, the thermal transfer image is formed on the receiving layer of the intermediate transfer medium by using the coloring material layer of the thermal transfer sheet.

* * * * *